United States Patent
Yuan et al.

(10) Patent No.: US 10,879,981 B2
(45) Date of Patent: *Dec. 29, 2020

(54) BEAM TRAINING SEQUENCE DESIGN METHOD AND APPARATUS

(71) Applicant: HUAWEI TECHNOLOGIES CO., LTD., Shenzhen, Guangdong (CN)

(72) Inventors: Di Yuan, Chengdu (CN); Qingchun Chen, Chengdu (CN); Min Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/670,519

(22) Filed: Oct. 31, 2019

(65) Prior Publication Data
US 2020/0067582 A1 Feb. 27, 2020

Related U.S. Application Data

(63) Continuation of application No. 16/234,185, filed on Dec. 27, 2018, now Pat. No. 10,498,420, which is a (Continued)

(30) Foreign Application Priority Data

Jun. 30, 2016 (CN) .......................... 2016 1 0512537

(51) Int. Cl.
H04B 7/06 (2006.01)
H04L 5/00 (2006.01)
(Continued)

(52) U.S. Cl.
CPC ........ H04B 7/0617 (2013.01); H04J 13/0014 (2013.01); H04L 5/0048 (2013.01); H04L 25/0202 (2013.01)

(58) Field of Classification Search
CPC .......... H03M 13/00–1505; H04J 13/00–0014; H04L 25/00–0204; H04L 5/0048;
(Continued)

(56) References Cited

U.S. PATENT DOCUMENTS 8,139,663 B2* 3/2012 Popovic .............. H04L 27/2655
375/260
8,165,185 B2* 4/2012 Zhang ................. H04L 27/2613
375/135
(Continued)

FOREIGN PATENT DOCUMENTS

CN 101355543 A 1/2009
CN 101447962 A 6/2009
(Continued)

OTHER PUBLICATIONS

C.C. Tseng et al, Complementary Sets of Sequences_ IEEE Transactions on Information Theory, vol. T-18, No. 5, Sep. 1972, 9 pages.
(Continued)

Primary Examiner — James M Perez
(74) Attorney, Agent, or Firm — Fish & Richardson P.C.

(57) ABSTRACT

The present disclosure relates to beam training sequence design methods and apparatus. One example method includes generating, by a transmit end, $N_T$ beam training sequences, where each beam training sequence includes a cyclic prefix and a Golay sequence with a length of 2×N×L, and the $N_T$ beam training sequences are orthogonal to each other, and sending, by the transmit end, the $N_T$ beam training sequences.

12 Claims, 7 Drawing Sheets

US 10,879,981 B2
Page 2

Related U.S. Application Data continuation of application No. PCT/CN2017/080419, filed on Apr. 13, 2017.

(51) Int. Cl.
*H04J 13/00* (2011.01)
*H04L 25/02* (2006.01)

(58) Field of Classification Search
CPC .......... H04B 7/06–0619; H04B 7/0695; H04B 7/08–086; H04B 7/088
See application file for complete search history.

(56) References Cited

U.S. PATENT DOCUMENTS

| | | | | |
|---|---|---|---|---|
| 8,265,177 | B2* | 9/2012 | Xia | H04B 7/0691 375/260 |
| 8,472,497 | B2* | 6/2013 | Lakkis | H04J 13/0014 375/130 |
| 8,867,636 | B2* | 10/2014 | Popovic | H04L 27/2649 375/260 |
| 8,891,592 | B1* | 11/2014 | Zhang | H04L 7/0091 375/149 |
| 9,337,998 | B2* | 5/2016 | Popovic | H04L 27/2649 |
| 9,369,271 | B2* | 6/2016 | Popovic | H04L 5/0007 |
| 9,386,126 | B2* | 7/2016 | Callard | H04L 67/10 |
| 9,461,866 | B2* | 10/2016 | Xiao | H04L 27/3863 |
| 9,516,664 | B2* | 12/2016 | Huang | H04L 5/0035 |
| 9,674,317 | B2* | 6/2017 | Zhang | H04L 69/22 |
| 9,749,772 | B2* | 8/2017 | MacMullen | H04W 72/0446 |
| 9,794,099 | B2* | 10/2017 | Xiao | H04L 27/3863 |
| 9,794,104 | B1* | 10/2017 | Montorsi | H04L 27/3422 |
| 9,923,665 | B2* | 3/2018 | Callard | H04L 1/0045 |
| 9,942,060 | B2* | 4/2018 | Kasher | H04B 7/086 |
| 9,973,362 | B2* | 5/2018 | Jia | H04L 27/2623 |
| 10,298,335 | B1* | 5/2019 | Xin | H04B 17/345 |
| 10,498,420 | B2* | 12/2019 | Yuan | H04L 5/0048 |
| 10,547,473 | B2* | 1/2020 | Kasher | H04J 13/0011 |
| 10,567,210 | B2* | 2/2020 | Montorsi | H04L 27/36 |
| 2005/0013381 | A1* | 1/2005 | Suh | H04L 25/0204 375/260 |
| 2006/0274841 | A1* | 12/2006 | Wang | H04L 25/0226 375/260 |
| 2008/0310567 | A1* | 12/2008 | Popovic | H04L 27/2649 375/354 |
| 2009/0097533 | A1* | 4/2009 | Lakkis | H04B 1/69 375/146 |
| 2009/0110031 | A1* | 4/2009 | Lakkis | H04J 13/16 375/130 |
| 2009/0125792 | A1* | 5/2009 | Lakkis | H04B 7/0695 714/783 |
| 2009/0318091 | A1 | 12/2009 | Wang et al. | |
| 2010/0080266 | A1* | 4/2010 | Zhang | H04J 13/102 375/140 |
| 2010/0118835 | A1* | 5/2010 | Lakkis | H04B 7/0695 370/336 |
| 2010/0272157 | A1* | 10/2010 | Lakkis | H04B 1/709 375/146 |
| 2010/0309958 | A1* | 12/2010 | Lakkis | H04J 13/0014 375/146 |
| 2010/0310009 | A1* | 12/2010 | Lakkis | H04L 27/2003 375/308 |
| 2011/0110340 | A1* | 5/2011 | Lakkis | H04W 72/0446 370/336 |
| 2012/0039409 | A1* | 2/2012 | Popovic | G01S 1/20 375/260 |
| 2012/0046047 | A1* | 2/2012 | Popovic | G01S 5/0226 455/456.1 |
| 2012/0057575 | A1* | 3/2012 | Taghavi Nasrabadi | H04B 17/12 370/338 |
| 2012/0106474 | A1* | 5/2012 | Wu | H04B 7/0619 370/329 |
| 2012/0134432 | A1* | 5/2012 | Popovic | H04L 27/2675 375/260 |
| 2012/0134443 | A1* | 5/2012 | Popovic | H04L 27/2655 375/316 |
| 2012/0207192 | A1* | 8/2012 | Zhang | H04J 13/102 375/135 |
| 2013/0272461 | A1* | 10/2013 | Lomayev | H04L 25/03159 375/340 |
| 2014/0003475 | A1* | 1/2014 | Xin | H04J 13/0055 375/219 |
| 2014/0003557 | A1* | 1/2014 | Wu | H04L 25/0258 375/343 |
| 2014/0314137 | A1* | 10/2014 | Lakkis | H04L 25/03006 375/232 |
| 2015/0288446 | A1* | 10/2015 | Yin | H04Q 11/0067 398/28 |
| 2016/0261402 | A1* | 9/2016 | Popovic | H04L 27/2655 |
| 2016/0308594 | A1* | 10/2016 | Sanderovich | H04L 27/2613 |
| 2016/0323755 | A1* | 11/2016 | Cordeiro | H04B 7/0617 |
| 2017/0033844 | A1* | 2/2017 | Kasher | H04J 13/0014 |
| 2017/0033845 | A1* | 2/2017 | Sanderovich | H04B 7/0808 |
| 2017/0111143 | A1* | 4/2017 | Seok | H04L 1/0091 |
| 2017/0212210 | A1* | 7/2017 | Chen | G01S 5/06 |
| 2017/0222852 | A1* | 8/2017 | Eitan | H04W 28/26 |
| 2017/0257201 | A1* | 9/2017 | Eitan | H04L 27/2602 |
| 2017/0257245 | A1* | 9/2017 | Shinagawa | H04L 27/2656 |
| 2017/0288935 | A1* | 10/2017 | Montorsi | H04L 27/3422 |
| 2017/0317852 | A1* | 11/2017 | Lomayev | H04L 25/0226 |
| 2017/0324461 | A1* | 11/2017 | Lomayev | H04L 5/0048 |
| 2018/0019848 | A1* | 1/2018 | Lomayev | H04L 27/2636 |
| 2018/0026750 | A1* | 1/2018 | Kravtsov | H04L 1/0625 375/267 |
| 2018/0034678 | A1* | 2/2018 | Montorsi | H04L 27/3422 |
| 2018/0054329 | A1* | 2/2018 | Yan | H04L 25/0202 |
| 2018/0062902 | A1* | 3/2018 | Gagiev | H04L 23/00 |
| 2018/0241490 | A1* | 8/2018 | Shinagawa | H04L 27/18 |
| 2018/0262366 | A1* | 9/2018 | Sahin | H04L 25/0204 |
| 2018/0302245 | A1* | 10/2018 | Oh | H04B 7/0684 |
| 2019/0074873 | A1* | 3/2019 | Liu | H04B 7/0695 |
| 2019/0081819 | A1* | 3/2019 | Kasher | H04B 7/086 |
| 2019/0132036 | A1* | 5/2019 | Yuan | H04L 5/0048 |
| 2019/0132061 | A1* | 5/2019 | Xin | H04L 25/0212 |
| 2019/0159128 | A1* | 5/2019 | Lin | H04L 5/0023 |
| 2019/0190637 | A1* | 6/2019 | Lomayev | H04L 27/2602 |
| 2019/0260621 | A1* | 8/2019 | Liu | H04L 5/0007 |
| 2020/0067582 | A1* | 2/2020 | Yuan | H04L 5/0048 |

FOREIGN PATENT DOCUMENTS

| | | |
|---|---|---|
| CN | 101529735 A | 9/2009 |
| CN | 102468879 | 5/2012 |
| CN | 101682377 A | 3/2013 |
| CN | 103532654 A | 1/2014 |
| CN | 103581078 A | 2/2014 |
| CN | 104104462 A | 10/2014 |
| EP | 2680471 A1 | 1/2014 |
| JP | 2012504378 A | 2/2012 |
| JP | 2012100258 A | 5/2012 |
| JP | 2018518855 A | 7/2018 |

OTHER PUBLICATIONS

Extended European Search Report issued in European Application No. 17818901.5 dated Apr. 5, 2019, 8 pages.

IEEE Std 802.11ad™-2012, IEEE Standard for Information technology—Telecommunications and information exchange between systems Local and metropolitan area networks—Specific requirements, Part 11: Wireless LAN Medium Access Control(MAC) and Physical Layer (PHY) Specifications, Amendment 3: Enhancements for Very HighWhroughput in the 60 GHz Band. Dec. 28, 2012, 628 pages.

International Search Report and Written Opinion issued in International Application No. PCT/CN2017/080419 dated Jun. 8, 2017, 19 pages.

Kiaohu Tang et al, Multiple Binary ZCZ Sequence Sets With Good Cross-Correlation Property Based on Complementary Sequence

(56) References Cited

OTHER PUBLICATIONS

Sets, IEEE Transactions on Information Theory, vol. 56, No. 8, Aug. 2010, 8 pages.

M. Golay, Complementary series. IRE Transactions on Information Theory, vol. 7, Issue: 2, Apr. 1961. 6 pages.

Ryota Kimura et al, Golay sequence aided channel estimation for millimeter-wave WPAN systems. 2008 IEEE 19th International Symposium on Personal, Indoor and Mobile Radio Communications, Dec. 8, 2008, 5 pages.

S. Foster, Impulse response measurement using Golay codes_ ICASSP "86. IEEE International Conference on Acoustics, Speech, and Signal Processing, Jan. 29, 2003, 4 pages.

Office Action issued in Chinese Application No. 201610512537.5 dated Feb. 3, 2020, 16 pages (with English translation).

Office Action issued in Japanese Application No. 2018-567693 dated Jan. 7, 2020, 8 pages (with English translation).

\* cited by examiner

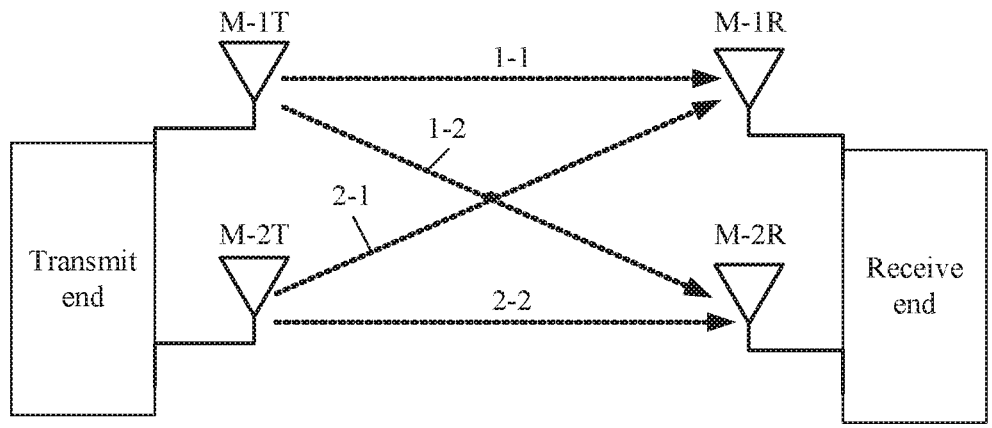
FIG. 1
| The Sequence Ga₁₂₈(n), to be transmitted from left to right, up to down |
|---|
| [sequence of +1/-1 values] |
| The Sequence Gb₁₂₈(n), to be transmitted from left to right, up to down |
|---|
| [sequence of +1/-1 values] |
FIG. 2
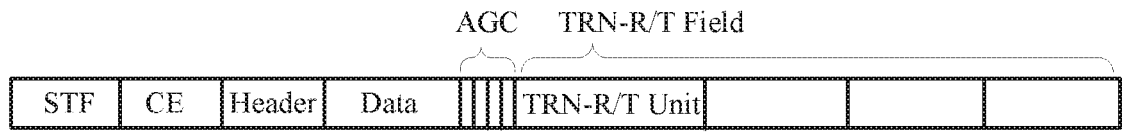
FIG. 3-a

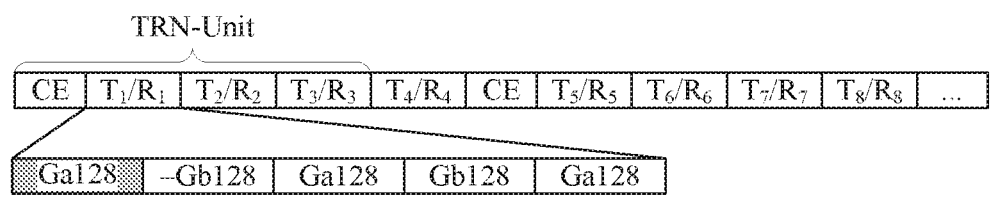
FIG. 3-b
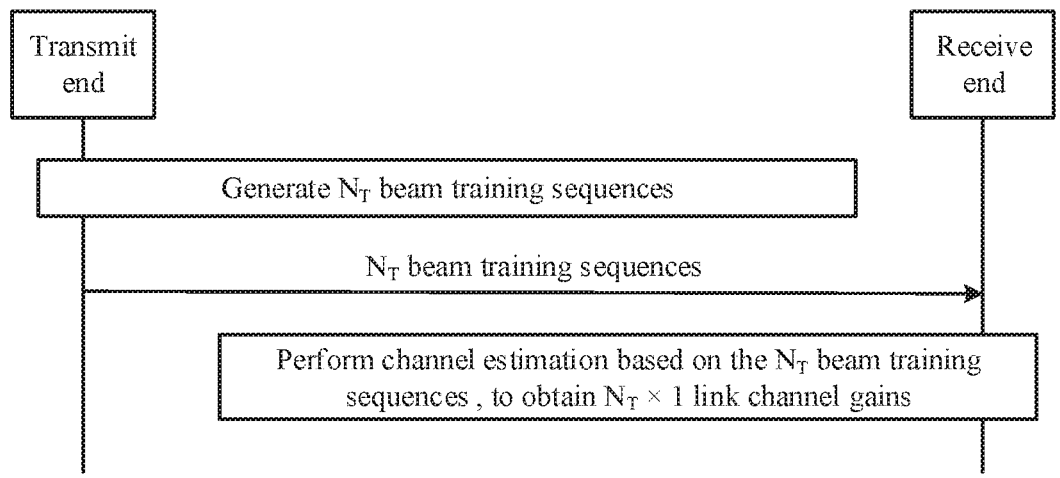
FIG. 4

| $G_{ai}L$ | $-G_{bi}L$ | $G_{ai}L$ | $G_{bi}L$ | $G_{ai}L$ |
|---|---|---|---|---|
| $-G_{ai}L$ | $-G_{bi}L$ | $-G_{ai}L$ | $G_{bi}L$ | $-G_{ai}L$ |
| $-G_{ai}L$ | $-G_{bi}L$ | $G_{ai}L$ | $-G_{bi}L$ | $-G_{ai}L$ |
| $G_{ai}L$ | $-G_{bi}L$ | $-G_{ai}L$ | $-G_{bi}L$ | $G_{ai}L$ |

FIG. 7-d

| $G_{ai}L$ | $-G_{bi}L$ | $G_{ai}L$ | $G_{bi}L$ | $G_{ai}L$ |
|---|---|---|---|---|
| $-G_{ai}L$ | $-G_{bi}L$ | $-G_{ai}L$ | $G_{bi}L$ | $-G_{ai}L$ |
| $-G_{ai}L$ | $-G_{bi}L$ | $G_{ai}L$ | $-G_{bi}L$ | $-G_{ai}L$ |
| $G_{ai}L$ | $-G_{bi}L$ | $-G_{ai}L$ | $-G_{bi}L$ | $G_{ai}L$ |
| $G_{aj}L$ | $-G_{bj}L$ | $G_{aj}L$ | $G_{bj}L$ | $G_{aj}L$ |
| $-G_{aj}L$ | $-G_{bj}L$ | $-G_{aj}L$ | $G_{bj}L$ | $-G_{aj}L$ |
| $-G_{aj}L$ | $-G_{bj}L$ | $G_{aj}L$ | $-G_{bj}L$ | $-G_{aj}L$ |
| $G_{aj}L$ | $-G_{bj}L$ | $-G_{aj}L$ | $-G_{bj}L$ | $G_{aj}L$ |

FIG. 7-e

BEAM TRAINING SEQUENCE DESIGN METHOD AND APPARATUS

CROSS-REFERENCE TO RELATED APPLICATIONS

This application is a continuation of U.S. patent application Ser. No. 16/234,185, filed on Dec. 27, 2018, which is a continuation of International Application No. PCT/CN2017/080419, filed on Apr. 13, 2017. The International Application claims priority to Chinese Patent Application No. 201010512537.5, filed on Jun. 30, 2016. All of the aforementioned patent applications are hereby incorporated by reference in their entireties.

TECHNICAL FIELD

The present invention relates to the communications field, and specifically, to a beam training sequence design method and apparatus.

BACKGROUND

In beam forming training, one or more antennas are configured between a transmit end and a receive end. A beam training sequence is sent between the transmit end and the receive end for channel estimation on a communication channel between the transmit end and the receive end. Then communication performance of the communication channel is determined by using a result of the channel estimation.

In the beamforming training, different beam training sequences are required to perform beamforming training in different communication channel scenarios (for example, different scenarios that are corresponding to different maximum delay spread of communication channels, different channel bonding quantities, and different quantities of antennas). However, an existing beam training sequence design method is applicable to very limited communication channel scenarios, and cannot satisfy various different communication channel training requirements in communications systems. As a result, the current beam training sequence design method has a limitation.

SUMMARY

Embodiments of the present invention provide a beam training sequence design method and apparatus, so that a beam training sequence can be applied to various communication channels configured in different scenarios.

According to a first aspect, an embodiment of the present invention provides a beam training sequence design method, including: generating, by a transmit end, $N_T$ beam training sequences, where each beam training sequence includes a cyclic prefix and a Golay sequence with a length of 2×N×L, the $N_T$ Golay sequences are orthogonal to each other, $N_T$ is a quantity of antennas at the transmit end, L is a signal length corresponding to a maximum delay $T_m$ of a channel, $N_T$ is a positive integer, N is a positive integer, L is a positive integer, and a length of the cyclic prefix is L; and sending, by the transmit end, the $N_T$ beam training sequences to a receive end by using the $N_T$ transmit antennas at the transmit end, where each transmit antenna sends one corresponding beam training sequence.

Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

Optionally, the generating, by a transmit end, $N_T$ beam training sequences includes:

generating, by the transmit end, M pairs of Golay complementary sequences with a length of L in a preset Golay complementary sequence generation manner, where the M pairs of Golay complementary sequences with a length of L are defined in a finite $Z_H$ field, each pair of the M pairs of Golay complementary sequences with a length of L includes two Golay complementary sequences with a length of L, L is the signal length corresponding to the maximum delay $T_m$ of the channel, both M and L are positive integers, and the $Z_H$ field is an H-dimensional area;

obtaining, by the transmit end, $N_T$ orthogonal Golay sequences with a length of 2×N×L based on the M pairs of Golay complementary sequences with a length of L, where $N_T$ is the quantity of antennas at the transmit end, $N_T$ is a positive integer, N is a positive integer, and a value of M is greater than or equal to a value of $N_T$; and adding, by the transmit end, the cyclic prefix with a length of L ahead of each of the $N_T$ orthogonal Golay sequences with a length of 2×N×L, to obtain the beam training sequences applied to the channel having $N_T$ antennas.

Optionally, the obtaining, by the transmit end, $N_T$ orthogonal Golay sequences with a length of 2×N×L based on the M pairs of Golay complementary sequences with a length of L includes:

obtaining, by the transmit end, $N_T$ pairs of Golay complementary sequences with a length of L from the M pairs of Golay complementary sequences with a length of L; and placing repeatedly and alternately, by the transmit end, each pair of the $N_T$ pairs of Golay complementary sequences with a length of L for N times in a first preset manner, to obtain the $N_T$ orthogonal Golay sequences with a length of 2×N×L.

The $N_T$ orthogonal Golay complementary sequences with a length of 2×N×L may be obtained through multiplication by an orthogonal matrix, where L is the signal length corresponding to the maximum delay $T_m$ of the channel; and the cyclic prefix with a length of L is added ahead of each Golay sequence to obtain the beam training sequences for beam training on the channel having $N_T$ antennas, so that the beam training sequence can be no longer restricted by a quantity of antennas, a delay spread value of a channel, and a scenario such as multi-channel bonding, and is applicable to different channel scenario configurations.

Optionally, the obtaining, by the transmit end, $N_T$ orthogonal Golay sequences with a length of 2×N×L based on the M pairs of Golay complementary sequences with a length of L includes:

obtaining, by the transmit end, $\lceil N_T/2N \rceil$ pairs of Golay complementary sequences with a length of L from the M pairs of Golay complementary sequences with a length of L; and placing repeatedly and alternately, by the transmit end, each pair of the $\lceil N_T/2N \rceil$ pairs of Golay complementary sequences with a length of L for N times in a second preset manner, and multiplying sequences obtained after the repeated and alternate placing by a preset orthogonal matrix, to obtain the $N_T$ orthogonal Golay sequences with a length of 2×N×L, where the preset orthogonal matrix is a 2N-order orthogonal matrix.

The $N_T$ orthogonal Golay complementary sequences with a length of 2×N×L may be obtained through multiplication by an orthogonal matrix, where L is the signal length corresponding to the maximum delay $T_m$ of the channel; and the cyclic prefix with a length of L is added ahead of each Golay sequence to obtain the beam training sequences for beam training on the channel having $N_T$ antennas, so that the beam training sequence can be no longer restricted by a quantity of antennas, a delay spread value of a channel, and a scenario such as multi-channel bonding, and is applicable to different channel scenario configurations.

Optionally, the signal length L corresponding to the maximum delay $T_m$ of the channel is as follows:

$L=2^{\lceil log_2 \lfloor R_s T_m \rfloor \rceil}$, where $R_s$ is a symbol rate of the channel.

Optionally, channel configurations of the channel include any one of the following channel configurations:

if the maximum delay $T_m$ of the channel is 72 nanoseconds, a channel bonding CB quantity is 1 so that $R_s$ is 1.76 Gbit/s, and the quantity $N_T$ of antennas at the transmit end is 2, 4, or 8, in the channel configuration, the maximum delay $T_m$ of the channel, the channel bonding CB quantity, and the quantity $N_T$ of antennas at the transmit end are any combination of the following parameter values:

the maximum delay $T_m$ of the charnel is 72 nanoseconds or 300 nanoseconds;

the channel bonding CB quantity is 1, 2, 3, or 4, so that $R_s$ is 1.76 Gbit/s, 3.52 Gbit/s, 5.28 Gbit/s, or 7.04 Gbit/s; and the quantity $N_T$ of antennas at the transmit end is 1, 2, 4, or 8.

Optionally, the cyclic prefix is a Golay sequence.

According to a second aspect, an embodiment of the present invention provides a beam training sequence design apparatus, including modules configured to perform the method in the first aspect.

According to a third aspect, an embodiment of the present invention further provides a beam training sequence design apparatus. The apparatus includes a memory, a processor, and $N_T$ transmit antennas. The memory is configured to store a program instruction, and the processor is configured to support the beam training sequence design apparatus in performing corresponding functions in the beam training sequence design method provided in the first aspect.

According to a fourth aspect, the present invention provides a computer storage medium, configured to store a computer software instruction used by an apparatus provided in the third aspect. The computer storage medium includes a program designed to perform the foregoing aspects.

It can be learned that, in the technical solutions provided in the embodiments of the present invention, the transmit end generates the $N_T$ beam training sequences; then the transmit end sends the $N_T$ beam training sequences to the receive end by using the $N_T$ transmit antennas at the transmit end; and after the receive end receives the $N_T$ beam training sequences, each antenna at the receive end performs channel estimation based on the $N_T$ beam training sequences, to obtain $N_T \times 1$ link channel gains. Each beam training sequence includes the cyclic prefix and the Golay sequence with a length of $2 \times N \times L$. The $N_T$ Golay sequences are orthogonal to each other. $N_T$ is the quantity of antennas at the transmit end. L is the signal length corresponding to the maximum delay $T_m$ of the channel. $N_T$ is a positive integer. N is a positive integer. L is a positive integer. Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

BRIEF DESCRIPTION OF DRAWINGS

To describe the technical solutions in the embodiments of the present invention art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a schematic diagram of an application scenario of a sequence-based channel estimation method according to the present invention;

FIG. 2 is a schematic diagram of a pair of Golay complementary sequences according to an embodiment of the present invention;

FIG. 3-*a* is a schematic structural diagram of a BRP frame of a beam training sequence according to an embodiment of the present invention;

FIG. 3-*b* is a schematic diagram of a beam training sequence T/R structure according to an embodiment of the present invention;

FIG. 4 is a schematic flowchart of a first embodiment of a beam training sequence design method according to an embodiment of the present invention;

FIG. 6-*b* is a first schematic diagram of a beam training sequence according to an embodiment of the present invention;

FIG. 7-*b* is a second schematic diagram of a beam training sequence according to an embodiment of the present invention;

FIG. 7-*c* is a third schematic diagram of a beam training sequence according to an embodiment of the present invention;

FIG. 7-*d* is a fourth schematic diagram of a beam training sequence according to an embodiment of the present invention;

FIG. 7-*e* is a fifth schematic diagram of a beam training sequence according to an embodiment of the present invention;

DESCRIPTION OF EMBODIMENTS

Figure 5:
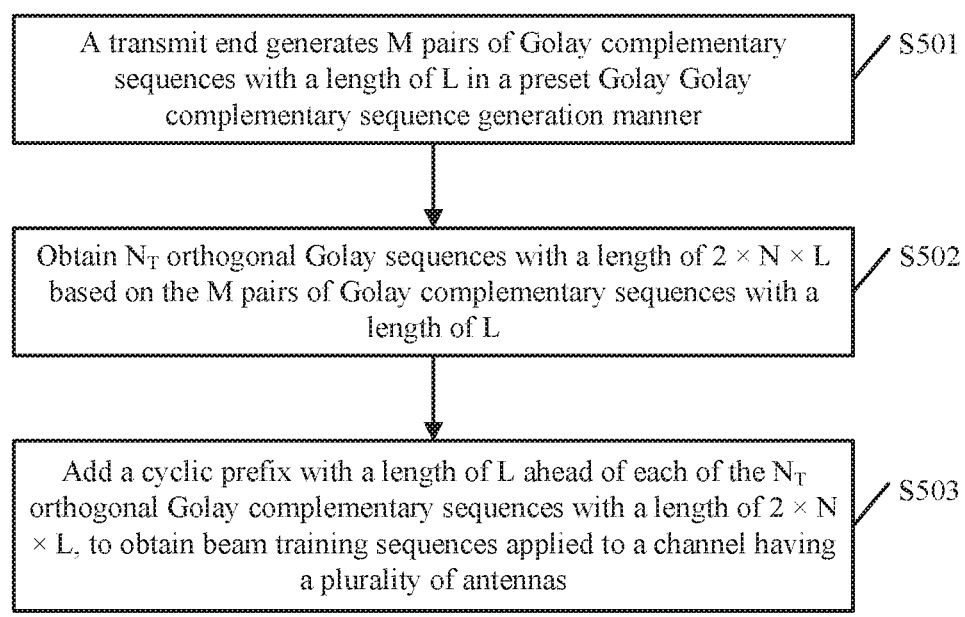
FIG. 5 is a schematic flowchart of a second embodiment of a beam training sequence design method according to an embodiment of the present invention.

Embodiments of the present invention provide a beam training sequence design method and apparatus, so that a beam training sequence can be applied to various communication channels configured in different scenarios.

To make persons skilled in the art understand the technical solutions in the present invention better, the following clearly describes the technical solutions in the embodiments of the present invention with reference to the accompanying drawings in the embodiments of the present invention.

Apparently, the described embodiments are merely some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", and so on are intended to distinguish between different objects but do not indicate a particular order. In addition, the term "including" or any variant thereof is intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An embodiment of the present invention provides a beam training sequence design method, including:

generating, by a transmit end, $N_T$ beam training sequences, where each beam training sequence includes a cyclic prefix and a Golay sequence with a length of 2×N×L, the $N_T$ Golay sequences are orthogonal to each other, $N_T$ is a quantity of antennas at the transmit end, L is a signal length corresponding to a maximum delay $T_m$ of a channel, $N_T$ is a positive integer, N is a positive integer, and L is a positive integer; and sending, by the transmit end, the $N_T$ beam training sequences to a receive end by using the $N_T$ transmit antennas at the transmit end, where each transmit antenna sends one corresponding beam training sequence.

In this embodiment of the present invention, the transmit end generates the beam training sequences related to the quantity of antennas, the maximum delay of the channel, and a channel bonding quantity, so that the beam training sequence design method in this embodiment of the present invention is no longer restricted by a quantity of antennas, a delay spread value of a channel, and a scenario such as multi-channel bonding, and the beam training sequence is applicable to different channel scenario configurations.

First, FIG. 1 is a schematic diagram of an application scenario of a sequence-based channel estimation method according to the present invention. This embodiment of the present invention is applicable to channel estimation under a MIMO multi-channel condition, and also applicable to channel estimation under a single-channel condition.

A MIMO system shown in FIG. 1 includes a transmit end and a receive end. For example, the transmit end and the receive end each include two antennas. Referring to FIG. 1-a, the transmit end includes a transmit antenna M-1T and a transmit antenna M-2T, and the receive end includes a receive antenna M-1R and a receive antenna M-2R.

There are a total of four channels between the two transmit antennas and the two receive antennas: 1-1 (a channel between the M-1T and the M-1R), 1-2 (a channel between the M-1T and the M-2R), 2-1 (a channel between the M-2T and the M-1R), and 2-2 (a channel between the M-2T and the M-2R).

In the MIMO system, a target signal obtained after a signal sent by a transmit antenna is transmitted through a channel may be received by all the receive antennas. For example, the M-1T sends a source signal, a target signal obtained after the source signal is transmitted through the 1-1 channel may be received by the M-1R, and a target signal obtained after the source signal is transmitted through the 1-2 channel may be received by the M-2R.

FIG. 2 is a schematic diagram of a pair of Golay complementary sequences according to an embodiment of the present invention. FIG. 3-a is a schematic structural diagram of a BRP frame of a beam training sequence according to an embodiment of the present invention. FIG. 3-b is a schematic diagram of a beam training sequence T/R structure according to an embodiment of the present invention.

The beam training sequence (T/R sequence) provided in this embodiment of the present invention is designed based on a beam refinement protocol (BRP for short) frame structure used in the IEEE 802.11ad standard. As shown in FIG. 3-a, a beam training TRN field in the BRP frame structure includes N (N<17) TRN-Units, and each TRN-Unit is divided into two parts: CE and T/R. In the prior art, CE includes eight Golay complementary sequences with a length of 128 (Ga128 and Gb128), and cyclic prefixes and cyclic suffixes that are placed ahead of and after the Golay complementary sequences respectively, and can satisfy a multi-path channel estimation requirement in a 72 ns delay spread range. As shown in FIG. 3-b, the T/R field includes four Golay complementary sequences with a length of 128 (Ga128 and Gb128), and cyclic prefixes placed ahead of the Golay complementary sequences, so that channel measurement may be roughly performed by using a time-domain measurement method, and accurate channel estimation may be performed in frequency domain. However, the beam training sequence can satisfy only a delay of 72 ns, and is only specific to a single-input single-output (SISO for short) channel scenario, and no corresponding design is provided for a larger delay and a multiple-input multiple-output (MIMO for short) channel scenario. This embodiment of the present invention is further designed based on the T/R sequence structure, shown in FIG. 3-b, provided by the IEEE 802.11ad standard.

FIG. 4 is a schematic flowchart of a first embodiment of a beam training sequence design method according to an embodiment of the present invention. As shown in FIG. 4, the method includes the following steps.

S401. A transmit end generates $N_T$ beam training sequences.

In this embodiment of the present invention, each transmit end has $N_T$ transmit antennas, and each antenna sends one beam training sequence.

Specifically, when sending the beam training sequence, the antenna sends a BRP frame that includes the beam training sequence and that is based on a BRP frame structure shown in FIG. 3-a.

Referring to FIG. 1-d, each beam training sequence includes a cyclic prefix and a Golay sequence with a length of 2×N×L. The $N_T$ Golay sequences are orthogonal to each other. $N_T$ is a quantity of antennas at the transmit end. L is a signal length corresponding to a maximum delay $T_m$ of a channel. $N_T$ is a positive integer. N is a positive integer. L is a positive integer. A length of the cyclic prefix is L.

Preferably, the cyclic prefix is a Golay sequence.

It may be understood that because a quantity of beam training sequences is the quantity $N_T$ of antennas, and a length of the beam training sequence is the signal length corresponding to the maximum delay $T_m$ of the channel, the beam training sequence is related to a channel bonding quantity, and the beam training sequence can satisfy requirements for various quantities of antennas and different maximum delays of channels.

Optionally, the maximum delay $T_m$ of the to-be-estimated channel may be greater than or equal to 72 nanoseconds (ns), or certainly may be less than 72 ns. This is not limited herein.

Optionally, there may be a single antenna or may be a plurality of antennas.

S402. The transmit end sends the $N_T$ beam training sequences to a receive end by using $N_T$ transmit antennas at the transmit end, where each transmit antenna sends one corresponding beam training sequence.

S403. The receive end receives the $N_T$ channel estimation training sequence packets sent by the transmit end.

Specifically, assuming that the receive end has $N_R$ receive antennas, each receive antenna receives the $N_T$ channel estimation training sequence packets, where $N_R$ is a positive integer greater than or equal to 1.

S404. Each receive antenna at the receive end performs channel estimation based on the $N_T$ channel estimation training sequence packets, to obtain $N_T \times 1$ link channel gains.

Optionally, after receiving the $N_T$ channel estimation training sequence packets, each receive antenna at the receive end performs correlation operations by using $N_T$ correlators corresponding to the $N_T$ channel estimation training sequences, to obtain the $N_T \times 1$ link channel gains, namely, a channel estimation result.

Further, a complete channel estimation result of the $N_R$ receive antennas is an $N_R \times N_T$ channel estimation result.

It can be learned that, in the technical solution provided in this embodiment of the present invention, the transmit end generates the $N_T$ beam training sequences; then the transmit end sends the $N_T$ beam training sequences to the receive end by using the $N_T$ transmit antennas at the transmit end; and after the receive end receives the $N_T$ beam training sequences, each antenna at the receive end performs channel estimation based on the $N_T$ beam training sequences, to obtain the $N_T \times 1$ link channel gains. Each beam training sequence includes the cyclic prefix and the Golay sequence with a length of 2×N×L. The $N_T$ Golay sequences are orthogonal to each other. $N_T$ is the quantity of antennas at the transmit end. L is the signal length corresponding to the maximum delay $T_m$ of the channel. $N_T$ is a positive integer. N is a positive integer. L is a positive integer. Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

The signal length L corresponding to the maximum delay $T_m$ of the channel may be understood as a length of a signal that can be transmitted based on a symbol rate of the channel under the maximum delay $T_m$.

Preferably, in some possible implementations of the present invention, the signal length L corresponding to the maximum delay $T_m$ of the channel is as follows:

$L = 2^{\log_2 \lfloor R_s T_m \rfloor}$, where $R_s$ is the symbol rate of the channel.

It may be understood that a Golay sequence with a signal length related to a maximum delay of a channel is designed and used as a beam training sequence of the channel, so that the beam training sequence is applicable to different maximum delays of channels.

Optionally, in some possible implementations of the present invention, channel configurations of the channel that may be applied to the designed Golay complementary sequences include any one of the following channel configurations:

if the maximum delay $T_m$ of the channel is 72 nanoseconds, the channel bonding CB quantity is 1 so that $R_s$ is 1.76 Gbit/s, and the quantity $N_T$ of antennas at the transmit end is 2, 4, or 8, in the channel configuration, the maximum delay $T_m$ of the channel, the channel bonding CB quantity, and the quantity $N_T$ of antennas at the transmit end are any combination of the following parameter values:

the maximum delay $T_m$ of the charnel is 72 nanoseconds or 300 nanoseconds;

the channel bonding CB quantity is 1, 2, 3, or 4, so that $R_s$ is 1.76 Gbit/s, 3.52 Gbit/s, 5.28 Gbit/s, or 7.04 Gbit/s; and the quantity $N_T$ of antennas at the transmit end is 1, 2, 4, or 8.

The channel bonding (CB for short) quantity is a quantity of channels bonded between the transmit end and the receive end.

It may be understood that the beam training sequence can satisfy different channel delays, quantities of antennas, and channel bonding quantities, so that a communications configuration can satisfy any one of the foregoing scenarios.

FIG. 5 is a schematic flowchart of a second embodiment of a beam training sequence design method according to an embodiment of the present invention. In the method shown in FIG. 5, for content that is the same as or similar to content in the method shown in FIG. 4, refer to detailed descriptions in FIG. 4. Details are not described herein again. As shown in FIG. 5, the method includes the following steps.

S501. A transmit end generates M pairs of Golay complementary sequences with a length of L in a preset Golay complementary sequence generation manner.

The M pairs of Golay complementary sequences with a length of L are defined in a finite $Z_H$ field. Each pair of the M pairs of Golay complementary sequences with a length of L includes two Golay complementary sequences with a length of L. L is a signal length corresponding to a maximum delay $T_m$ of a channel. Both M and L are positive integers.

Preferably, in some possible implementations of the present invention, the generating M pairs of Golay complementary sequences with a length of L in a preset Golay complementary sequence generation manner includes:

assuming that the Golay complementary sequences include $G_{ai}L=a$ and $G_{bi}L=b$, and generating the M pairs of Golay complementary sequences with a length of L by using the following formulas:

assuming that $a = \{a_i\}_{i=0}^{2^m-1}$ and $b = \{b_i\}_{i=0}^{2^m-1}$, $$\text{where } a_i = \frac{H}{2}\sum_{k=1}^{m-1} i_{\pi(k)} i_{\pi(k+1)} + \sum_{k=1}^{m} c_k i_k + c_0;$$

$$\text{and } b_i = a_i + \frac{H}{2} i_{\pi(1)} \text{ or } b_i = a_i + \frac{H}{2} i_{\pi(m)}; \text{ and } M = H^{(m+1)} \times \frac{m!}{2},$$

where a value is a positive integer ranging from 1 to M, $m = \log_2 \lfloor R_s T_m \rfloor$, π is a value obtained after {1, . . . , m} is mapped in a preset mapping manner, and $C_k$ is any value defined in the $Z_H$ field.

For example, in an example of the present invention, a pair of Golay complementary sequences may be obtained by using the foregoing formulas:

$G_a 128$=[11-1-1-1-1-1-1-11-111-1-1111-1-11111-11-11-111-1-1-11111111-11-1-111-111-1-11111-11-11-111-111-1-1-1-1-1-1-11-111-1-1111-1-11111-11-11-111-1-1-1-1-1-1-11-11-1-111-1-1-1-11-11-1-1-11]; and $G_b 128$=[-1-11111111-11-1-111-1-1-111-1-1-1-11-11-11-1-1111-1-1-1-1-1-1-11-111-11-1-111-1-1-11-11-11-1-1111-1-1-1-1-1-11-111-1-1111-1-11111-11-11-111-111-1-1-1-1-1-1-11-111-1-11-1-111-1-1-1-11-11-11-1-11].

Herein, on this basis, seven other pairs of Golay complementary sequences may be further obtained by using the formulas:

$G_{a2}128$=[1-1-11-11-11-1-1-1-111-1-11-1-111-11-1-1-1-1-1-111-111-11-11-11111-1-1111-1-111-11-1-1-1-1-1-1111-1-11-11-11-1-1-1-111-1-11-1-111-11-1-1-1-1-1-1111-1-11-11-11-1-1-1-111-1-1-111-1-11-11111111-1-1];

$G_{b2}128$=[-111-11-11-11111-1-111-111-1-11-11111111-1-11-1-11-11-1-1-1-111-1-1-111-1-11-11111111-1-11-1-11-11-11-1-1-1-111-1-11-1-111-11-1-1-1-1-1-1-1111-1-11-11-11-1-1-1-111-1-1-111-1-11-11111111-1-1];

$G_{a3}128$=[111-111-11-1-1-1111-11111-111-11111-1-1-11-1111-111-11-1-1-1111-11-1-1-11-1-11-1-1-1-1111-11111-111-11-1-1-1111-11111-111-11111-1-1-11-1-1-1-11-1-11-1111-1-1-11-1111-111-11111-1-1-11-1];

$G_{b3}128$=[111-111-11-1-1-1111-11111-111-11111-1-1-11-1111-111-11-1-1-1111-11-1-1-11-1-11-1-1-1-1111-11-1-1-11-1-11-1111-1-1-11-1-1-1-11-1-11-1-1-1-1111-11111-111-11-1-1111-11-1-1-11-1-11-1-1-1-1111-11];

$G_{a4}128$=[1-1111-1-1-1-11-1-11-1-1-11-1111-1-1-11-111-11111-1111-1-1-1-11-1-11-1-1-1-11-1-1-1111-11-1-1-11-1-1-11-1111-1-1-1-11-1-11-1-1-11-1111-1-1-11-111-1111-11-1-1-11111-111-11111-1111-1-1-11-111-1111];

$G_{b4}128$=[1-1111-1-1-1-11-1-11-1-1-11-1-1-11-1111-1-1-11-111-11111-1111-1-1-1-11-1-11-1-1-1-11-1-1-1111-11-1-1-11-1-1-1-1-11-1-1-11111-111-1111-1-1-1111-11-1-11-1-1-11-1111-1-1-1-11-1-11-1-1-1-1-11-1-1-1111-11-1-11-1-1-1];

$G_{a5}128$=[111-1-1-11-1111-111-11111-1-1-11-1-1-1-11-1-11-1111-1-11-1111-111-11-1-1-1111-11111-111-11111-1-1-11-1111-111-11111-1-1-11-1-1-1-11-1-11-1-1-1-1-1111-11-1-1-11-1-11-1111-1-1-11-1-1-1-11-1-11-1];

$G_{b5}128$=[111-1-1-11-1111-111-11111-1-1-11-1-1-1-11-1-11-1111-1-1-11-1111-111-11-1-1-1111-11111-111-11-1-1-1-1111-11-1-1-1-11-1-11-1-1-1-1111-11111-111-11111-1-1-11-1111-111-11-1-1-1111-11111-111-11];

$G_{a6}128$=[1-111-11111-1111-1-1-11-111-1111-11-1-1-1-11111-111-11111-1111-1-1-1-11-1-11-1-1-1-11-1111-1-1-11-111-11111-1111-1-1-11-111-1111-11-1-1-1111-11-1-11-1-1-1-11-1-1-11111-111-1111-11-1-1-1111];

$G_{b6}128$=[1-111-11111-1111-1-1-11-111-1111-11-1-1-11111-111-11111-1111-1-1-1-11-1-11-1-1-1-11-1111-1-1-1-11-1-1-1-11-1-1-1111-11-1-11-1-1-11-1111-1-1-11-111111-1111-1-1-1-11-1-11-1-1-1-11-1111-1-1-1];

$G_{a7}128$=[11-11111-111-11-1-1-1111-11111-1-1-11-11111-111-11111-111-11-1-1-11-1-11-1-1-1-1-1111-11-1-1-1111-11111-111-11-1-1-1111-11111-1-1-1-11-1111-11111-1-1-11-1111-11-1-1-1-1-11-1-1-11-1111-11];

$G_{b7}128$=[11-11111-111-11-1-1-1111-11111-1-1-11-1111-111-11111-111-11-1-1-11-1-11-1-1-1-1-1111-11-1-1-1111-11111-1-1-1-11-1-11-1111-1-1-11-1-1-1111-11-1-1-1111-11111-111-11-1-1-1-11-1-11-1-1-1-1111-11-1-1-1-11];

$G_{a8}128$=[1-1-1-11-1111-1-1-1-11-1-11-1-1-11-111-11111-1111-1-1-11-1111-1-1-1-11-1-11-1-1-1111-11-1-1-11-1-1-11-1111-1-1-1-11-1-1-1-11-1-11-1-1-1-11-111-11111-111-1111-11-1-1-11111-1111-1-1-1-11-111-11111-111]; and $G_{b8}128$=[1-1-1-11-1111-1-1-1-11-1-11-1-1-11-111-11111-1111-1-1-11-1111-1-1-1-11-1-11-1-1-1111-11-1-1-1-1111-11-1-1-11111-111-1111-11-1-1-1-1-1-1-11-1-1-1-1-1-11-1-1-1-1-11-1-11-1-1-1-11-1111-11-1-1-1-11-1-1-1-1-1-11-1-1-1].

In addition, four other groups of sequences with lengths of 256, 512, 1024, and 2048 are defined:

$Ga_i256$=[$Ga_i128$ $Gb_i128$] $Gb_i256$=[$Ga_i128$ $-Gb_i128$];

$Ga_i512$=[$Ga_i256$ $Gb_i256$] $Gb_i512$=[$Ga_i256$ $-Gb_i256$];

$Ga_i1024$=[$Ga_i512$ $Gb_i512$] $Gb_i1024$=[$Ga_i512$ $-Gb_i512$]; and $Ga_i2048$=[$Ga_i1024$ $Gb_i1024$]   $Gb_i2048$=[$Ga_i1024$ $-Gb_i1024$].

Optionally, in other possible implementations of the present invention, the Golay complementary sequences may be generated in another manner.

S502. The transmit end obtains $N_T$ orthogonal Golay sequences with a length of 2×N×L based on the M pairs of Golay complementary sequences with a length of L.

$N_T$ is a quantity of antennas at the transmit end. $N_T$ is a positive integer greater than 0. N is a positive integer greater than 0. A value of M is greater than or equal to a value of $N_T$.

S503. The transmit end adds a cyclic prefix with a length of L ahead of each of the $N_T$ orthogonal Golay complementary sequences with a length of 2×N×L, to obtain beam training sequences applied to a channel having $N_T$ antennas.

Optionally, the cyclic prefix may be a Golay sequence

Optionally, in some possible implementations of the present invention, the obtaining $N_T$ orthogonal Golay sequences with a length of 2×N×L based on the M pairs of Golay complementary sequences with a length of L includes:

obtaining $N_T$ pairs of Golay complementary sequences with a length of L from the M pairs of Golay complementary sequences with a length of L; and placing repeatedly and alternately each pair of the $N_T$ pairs of Golay complementary sequences with a length of L for N times in a first preset manner, to obtain the $N_T$ orthogonal Golay sequences with a length of 2×N×L.

The placing repeatedly and alternately each Golay complementary sequence with a length of L for N times in a first preset manner means adding a positive sign or a negative sign ahead of each Golay sequence with a length of L when repeatedly placing each Golay complementary sequence with a length of L, to finally obtain the $N_T$ orthogonal Golay complementary sequences with a length of 2×N×L. Adding a negative sign ahead of a Golay sequence means negation of each symbol in the Golay sequence. Adding a positive sign ahead of a Golay sequence means keeping each symbol in the Golay sequence unchanged.

In this embodiment of the present invention, the first preset manner of placing repeatedly and alternately the Golay complementary sequence is not unique, provided that the finally obtained $N_T$ Golay sequences with a length of 2×N×L are orthogonal to each other.

Preferably, a value of the quantity N of limes of the repeated and alternate placing is 2.

For example, in an example of the present invention, when the maximum delay $T_m$ of the channel is 72 ns, a symbol rate of the channel is 1.76 Gbps (in this case, there is no channel aggregation, to be specific, channel bonding CB quantity is 1), and a quantity of MIMO antennas is 2, first, any two pairs of Golay complementary sequences $G_{a1}128/G_{b1}128$ and $G_{a2}128/G_{b2}128$ are obtained from the M pairs of Golay complementary sequences generated in step S201, and the two pairs of Golay complementary sequences are repeatedly and alternately placed twice separately, to obtain two sequences [$-G_{b1}128$, $G_{a1}128$, $G_{b1}128$, $G_{a1}128$] and [$-G_{b2}128$, $G_{a2}128$, $G_{b2}128$, $G_{a2}128$]; or may be repeatedly and alternately placed twice in another manner, to obtain [$-G_{b1}128$, $-G_{a1}128$, $G_{b1}128$, $-G_{a1}128$] and [$-G_{b2}128$, $G_{a2}128$, $G_{b2}128$, $G_{a2}128$]. In the two cases, the two sequences are orthogonal to each other.

It may be understood that the Golay complementary sequences may be repeatedly and alternately placed in a specific manner to obtain the $N_T$ orthogonal Golay sequences with a length of 2×N×L, and then the cyclic prefix with a length of L is added ahead of each Golay sequence to obtain the beam training sequences for beam training on the channel having $N_T$ antennas, so that the beam training sequences can be no longer restricted by a quantity of antennas, a delay spread value of a channel, and a scenario such as multi-channel bonding, and is applicable to different channel scenario configurations.

Optionally, in other possible implementations of the present invention, the obtaining $N_T$ orthogonal Golay sequences with a length of 2×N×L based on the M pairs of Golay complementary sequences with a length of L includes:

obtaining $\lceil N_T/2N \rceil$ pairs of Golay complementary sequences with a length of L from the M pairs of Golay complementary sequences with a length of L; and placing repeatedly and alternately each pair of the $\lceil N_T/2N \rceil$ pairs of Golay complementary sequences with a length of L for N times in a second preset manner, and multiplying sequences obtained after the repeated and alternate placing by a preset orthogonal matrix, to obtain the $N_T$ orthogonal Golay sequences with a length of 2×N×L, where the preset orthogonal matrix is a 2N-order orthogonal matrix.

Preferably, a value of N is 2, so that the preset orthogonal matrix is a 4-order orthogonal matrix.

The placing repeatedly and alternately each pair of the $\lceil N_T/2N \rceil$ pairs of Golay complementary sequences with a length of L for N times in a second preset manner may be: placing repeatedly and alternately each pair of Golay complementary sequences with a length of L among the Golay complementary sequences in any manner, to obtain $\lceil N_T/2N \rceil$ Golay sequences with a length of 2×N×L. The $\lceil N_T/2N \rceil$ Golay sequences with a length of 2×N×L that are obtained after the placing in the second preset manner are not necessarily orthogonal to each other.

Preferably, when the value of N is 2, the preset orthogonal matrix is the 4-order orthogonal matrix. Therefore, $\lceil N_T/4 \rceil$ Golay sequences with a length of 2×N×L are multiplied by the 4-order orthogonal matrix to obtain $\lceil N_T/4 \rceil \times 4$ orthogonal Golay sequences with a length of 2×N×L, and then $N_T$ Golay sequences are selected from the $\lceil N_T/4 \rceil \times 4$ orthogonal Golay sequences with a length of 2×N×L to obtain $N_T$ orthogonal Golay sequences with a length of 2×N×L.

For example, in an example of the present invention, when the maximum delay $T_m$ of the channel is 72 ns, a symbol rate of the channel is 3.52 Gbps (in this case, a channel bonding CB quantity is 2), and a quantity of MIMO antennas is 8, first, any two pairs of Golay complementary sequences $G_{a1}256/G_{b1}256$ and $G_{a2}256/G_{b2}256$ are obtained from the M pairs of Golay complementary sequences generated in step S301, and the two pairs of Golay complementary sequences are repeatedly and alternately placed twice, to obtain sequences $[-G_{b1}256, G_{a1}256, G_{b1}256, G_{a1}256]$ and $[-G_{b2}256, G_{a2}256, G_{b2}256, G_{a2}256]$. Then the two pairs of sequences are multiplied by the 4-order orthogonal matrix P to obtain eight orthogonal Golay sequences, which are specifically as follows:

$$[-Gb_2256 \ Ga_2256 \ Gb_2256 \ Ga_2256] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_2256 & Ga_2256 & Gb_2256 & Ga_2256 \\ -Gb_2256 & -Ga_2256 & Gb_2256 & -Ga_2256 \\ -Gb_2256 & Ga_2256 & -Gb_2256 & -Ga_2256 \\ -Gb_2256 & -Ga_2256 & -Gb_2256 & Ga_2256 \end{bmatrix};$$

and $$[-Gb_1256 \ Ga_1256 \ Gb_1256 \ Ga_1256] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1256 & Ga_1256 & Gb_1256 & Ga_1256 \\ -Gb_1256 & -Ga_1256 & Gb_1256 & -Ga_1256 \\ -Gb_1256 & Ga_1256 & -Gb_1256 & -Ga_1256 \\ -Gb_1256 & -Ga_1256 & -Gb_1256 & Ga_1256 \end{bmatrix}.$$

It may be understood that the $N_T$ orthogonal Golay complementary sequences with a length of 2×N×L may be obtained through multiplication by the orthogonal matrix, where L is the signal length corresponding to the maximum delay $T_m$ of the channel; and the cyclic prefix with a length of L is added ahead of each Golay sequence to obtain the beam training sequences for beam training on the channel having $N_T$ antennas, so that the beam training sequence can be no longer restricted by a quantity of antennas, a delay spread value of a channel, and a scenario such as multi-channel bonding, and is applicable to different channel scenario configurations.

It can be learned that, in the technical solution provided in this embodiment of the present invention, the beam training sequences related to the quantity of antennas, the maximum delay of the channel, and the channel bonding quantity are generated. Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

Figure 6:
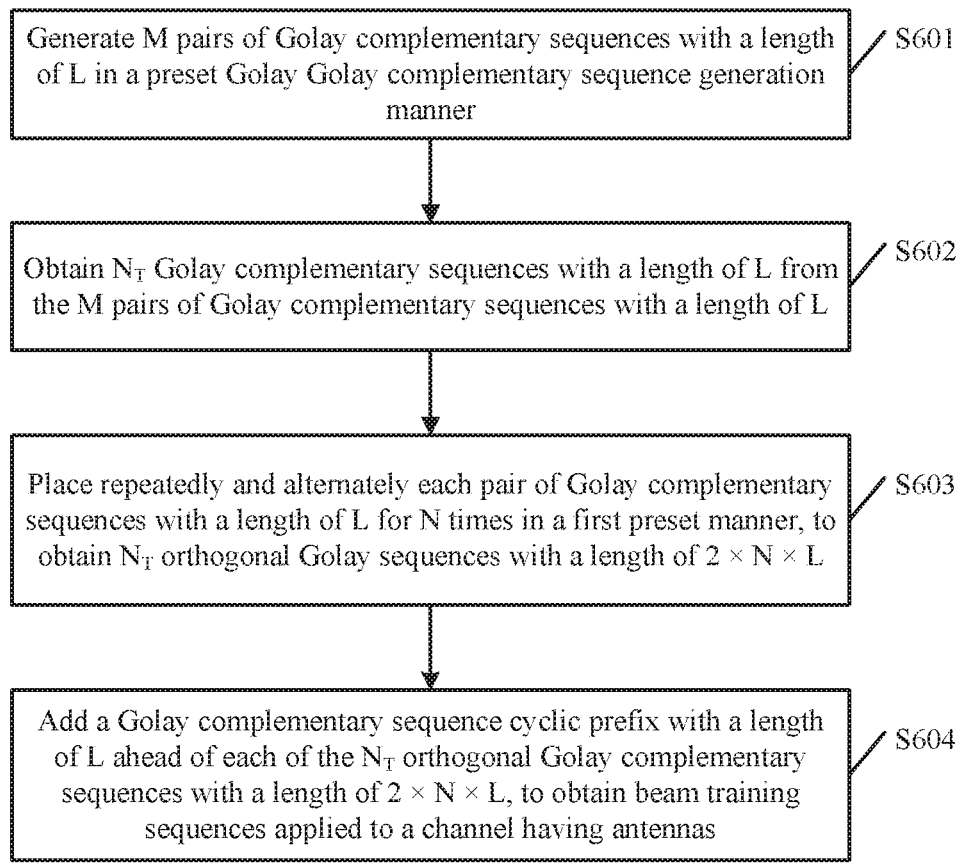
FIG. 6-*a* is a schematic flowchart of a third embodiment of a beam training sequence design method according to an embodiment of the present invention.

FIG. 6-a is a schematic flowchart of a third embodiment of a beam training sequence design method according to an embodiment of the present invention. In the method shown in FIG. 6-a, for content that is the same as or similar to content in the method shown in FIG. 4 or FIG. 5, refer to detailed descriptions in FIG. 4 or FIG. 5. Details are not described herein again. As shown in FIG. 6-a, the method includes the following steps.

S601. Generate M pairs of Golay complementary sequences with a length of L in a preset Golay complementary sequence generation manner.

The M pairs of Golay complementary sequences with a length of L are defined in a finite $Z_H$ field. Each pair of the M pairs of Golay complementary sequences with a length of L includes two Golay complementary sequences with a length of L. L is a signal length corresponding to a maximum delay $T_m$ of a channel. Both M and L are positive integers greater than 0.

S602. Obtain $N_T$ pairs of Golay complementary sequences with a length of L from the M pairs of Golay complementary sequences with a length of L.

$N_T$ is a quantity of antennas at a transmit end. $N_T$ is a positive integer greater than 0. N is a positive integer greater than 0. A value of M is greater than or equal to a value of $N_T$.

S603. Place repeatedly and alternately each pair of the $N_T$ pairs of Golay complementary sequences with a length of L for N times in a first preset manner, to obtain $N_T$ orthogonal Golay sequences with a length of 2×N×L.

S604. Add a Golay complementary sequence cyclic prefix with a length of L ahead of each of the $N_T$ orthogonal Golay complementary sequences with a length of 2×N×L, to obtain beam training sequences applied to a channel having $N_T$ antennas.

Specifically, the following describes examples of the beam training sequence generation method in different channel scenarios.

In a first embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 2.

Based on the solution in this embodiment, $L=2^m=2^{\lceil log_2 \lfloor R_s T_m \rfloor \rceil}=128$, and two pairs of Golay complementary sequences $G_{a1}128/G_{b1}128$ and $G_{a2}128/G_{b2}128$ may be generated.

Then the two pairs of Golay complementary sequences are repeatedly and alternately placed twice separately, and the cyclic prefix with a length of L is added, to construct a beam training sequence E-T/R. For details, refer to FIG. 6-b. FIG. 6-b is a first schematic diagram of a beam training sequence according to a third embodiment of the present invention.

In a second embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 4.

Based on the solution in this embodiment, $L=2^m=2^{\lceil log_2 \lfloor R_s T_m \rfloor \rceil}=128$, and four pairs of Golay complementary sequences $G_{a1}128/G_{b1}128$, $G_{a2}128/G_{b2}128$, $G_{a3}128/G_{b3}128$, and $G_{a4}128/G_{b4}128$ may be generated.

Then the four pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b. FIG. 6-b is a first schematic diagram of a beam training sequence according to an embodiment of the present invention.

In a third embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 8.

Based on the solution in this embodiment, $L=2^m=2^{\lceil log_2 \lfloor R_s T_m \rfloor \rceil}=128$, and eight pairs of Golay complementary sequences $G_{a1}128/G_{b1}128$, $G_{a2}128/G_{b2}128$, $G_{a3}128/G_{b3}128$, $G_{a4}128/G_{b4}128$, $G_{a5}128/G_{b5}128$, $G_{a6}128/G_{b6}128$, $G_{a7}128/G_{b7}128$, and $G_{a8}128/G_{b8}128$ may be generated.

Then the eight pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a fourth embodiment, it is assumed that the maximum delay $T_m$ of the to-be-estimated channel is 72 ns, a symbol rate $R_s$ is 3.52 Gbps (CB=2), and a quantity $N_T$ of SISO antennas is 1.

Based on the solution in this embodiment, $L=2^m=2^{\lceil log_2 \lfloor R_s T_m \rfloor \rceil}=256$, and one pair of Golay complementary sequences $G_{a1}256/G_{b1}256$ is generated.

Then the one pair of Golay complementary sequences is repeatedly and alternately placed twice separately, and the cyclic prefix with a length of L is added, to construct a beam training sequence E-T/R. Specifically, the beam training sequence E-T/R may be generated based on FIG. 6-b.

In a fifth embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 2.

Based on the solution in this embodiment, $L=2^m=2^{\lceil log_2 \lfloor R_s T_m \rfloor \rceil}=256$, and two pairs of Golay complementary sequences $G_{a1}256/G_{b1}256$ and $G_{a2}256/G_{b2}256$ may be generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a sixth embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 4.

Based on the solution in this embodiment, $L=2^m=2^{\lceil log_2 \lfloor R_s T_m \rfloor \rceil}=256$, and four pairs of Golay complementary sequences $G_{a1}256/G_{b1}256$, $G_{a2}256/G_{b2}256$, $G_{a3}256/G_{b3}256$, and $G_{a4}256/G_{b4}256$ may be generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a seventh embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 8.

Based on the solution in this embodiment. $L=2^m=2^{\lceil log_2 \lfloor R_s T_m \rfloor \rceil}=256$, and eight pairs of Golay complementary sequences $G_{a1}256/G_{b1}256$, $G_{a2}256/G_{b2}256$, $G_{a3}256/G_{b3}256$, $G_{a4}256/G_{b4}256$, $G_{a5}256/G_{b5}256$, $G_{a6}256/G_{b6}256$, $G_{a7}256/G_{b7}256$, and $G_{a8}256/G_{b8}256$ may be generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In an eighth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of SISO antennas is 1.

Based on the solution in this embodiment, $L=2^m=2^{\lceil log_2 \lfloor R_s T_m \rfloor \rceil}=512$, and one pair of Golay complementary sequences $G_{a1}512/G_{b1}512$ is generated.

Then the one pair of Golay complementary sequences is repeatedly and alternately placed twice separately, and the cyclic prefix with a length of L is added, to construct a beam training sequence E-T/R. Specifically, the beam training sequence E-T/R may be generated based on FIG. 6-b.

In a ninth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of MIMO antennas is 2.

Based on the solution in this embodiment, $L=2^m=2^{\lceil log_2 \lfloor R_s T_m \rfloor \rceil}=512$, and two pairs of Golay complementary sequences $G_{a1}512/G_{b1}512$ and $G_{a2}512/G_{b2}512$ are generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a tenth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of MIMO antennas is 4.

Based on the solution in this embodiment, $L=2^m=2^{log_2\lfloor R_s T_m \rfloor}=512$, and four pairs of Golay complementary sequences $G_{a1}512/G_{b1}512$, $G_{a2}512/G_{b2}512$, $G_{a3}512/G_{b3}512$, and $G_{a4}512/G_{b4}512$ are generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In an eleventh embodiment, it is assumed that the maximum delay $T_m$ of the to-be-estimated channel is 72 ns, a symbol rate $R_s$ is 5.28 Gbps or 7.04 Gbps (CB=3 or CB 4), and a quantity $N_T$ of MIMO antennas is 8.

Based on the solution in this embodiment, $L=2^m=2^{log_2\lfloor R_s T_m \rfloor}=512$, and eight pairs of Golay complementary sequences $G_{a1}512/G_{b1}512$, $G_{a2}512/G_{b2}512$, $G_{a3}512/G_{b3}512$, $G_{a4}512/G_{b4}512$, $G_{a5}512/G_{b5}512$, $G_{a6}512/G_{b6}512$, $G_{a7}512/G_{b7}512$, and $G_{a8}512/G_{b8}512$, are generated.

Then the eight pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a twelfth embodiment, it is assumed that the maximum delay $T_m$ of the to-be-estimated channel is 300 ns, a symbol rate $R_s$ is 1.76 Gbps (CB=1), and a quantity $N_T$ of SISO antennas is 1.

Based on the solution in this embodiment, $L=2^m=2^{log_2\lfloor R_s T_m \rfloor}=512$, and one pair of Golay complementary sequences $G_{a1}512/G_{b1}512$ is generated.

Then the one pair of Golay complementary sequences is repeatedly and alternately placed twice separately, and the cyclic prefix with a length of L is added, to construct a beam training sequence E-T/R. Specifically, the beam training sequence E-T/R may be generated based on FIG. 6-*b*.

In a thirteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 2.

Based on the solution in this embodiment, $L=2^m=2^{log_2\lfloor R_s T_m \rfloor}=512$, and two pairs of Golay complementary sequences $G_{a1}512/G_{b1}512$ and $G_{a2}512/G_{b2}512$ are generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a fourteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 4.

Based on the solution in this embodiment, $L=2^m=2^{log_2\lfloor R_s T_m \rfloor}=512$, and four pairs of Golay complementary sequences $G_{a1}512/G_{b1}512$, $G_{a2}512/G_{b2}512$, $G_{a3}512/G_{b3}512$, and $G_{a4}512/G_{b4}512$ are generated.

Then the four pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a fifteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 8.

Based on the solution in this embodiment, $L=2^m=2^{log_2\lfloor R_s T_m \rfloor}=512$, and eight pairs of Golay complementary sequences $G_{a1}512/G_{b1}512$, $G_{a2}512/G_{b2}512$, $G_{a3}512/G_{b3}512$, $G_{a4}512/G_{b4}512$, $G_{a5}512/G_{b5}512$, $G_{a6}512/G_{b6}512$, $G_{a7}512/G_{b7}512$, and $G_{a8}512/G_{b8}512$ are generated.

Then the eight pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a sixteenth embodiment, it is assumed that the maximum delay $T_m$ of the to-be-estimated channel is 300 ns, a symbol rate $R_s$ is 3.52 Gbps (CB=2), and a quantity $N_T$ of SISO antennas is 1.

Based on the solution in this embodiment, $L=2^m=2^{log_2\lfloor R_s T_m \rfloor}=1024$, and one pair of Golay complementary sequences $G_{a1}1024/G_{b1}1024$ is generated.

Then the one pair of Golay complementary sequences is repeatedly and alternately placed twice separately, and the cyclic prefix with a length of L is added, to construct a beam training sequence E-T/R. Specifically, the beam training sequence E-T/R may be generated based on FIG. 6-*b*.

In a seventeenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 2.

Based on the solution in this embodiment, $L=2^m=2^{log_2\lfloor R_s T_m \rfloor}=1024$, and two pairs of Golay complementary sequences $G_{a1}1024/G_{b1}1024$ and $G_{a2}1024/G_{b2}1024$ are generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In an eighteenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 4.

Based on the solution in this embodiment, $L=2^m=2^{log_2\lfloor R_s T_m \rfloor}=1024$, and four pairs of Golay complementary sequences $G_{a1}1024/G_{b1}1024$, $G_{a2}1024/G_{b2}1024$, $G_{a3}1024/G_{b3}1024$, and $G_{a4}1024/G_{b4}1024$ are generated.

Then the four pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a nineteenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 8.

Based on the solution in this embodiment, $L=2^m=2^{log_2\lfloor R_s T_m \rfloor}=1024$, and eight pairs of Golay complementary sequences $G_{a1}1024/G_{b1}1024$, $G_{a2}1024/G_{b2}1024$, $G_{a3}1024/G_{b3}1024$, $G_{a4}1024/G_{b4}1024$, $G_{a5}1024/G_{b5}1024$, $G_{a6}1024/G_{b6}1024$, $G_{a7}1024/G_{b7}1024$, and $G_{a8}1024/G_{b8}1024$ are generated.

Then the eight pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-*b*.

In a twentieth embodiment, it is assumed that the maximum delay $T_m$ of the to-be-estimated channel is 300 ns, a symbol rate $R_s$ is 5.28 Gbps (CB=3 or CB=4), and a quantity $N_T$ of SISO antennas is 1.

Based on the solution in this embodiment, $L=2^m=2^{\lceil log2\lfloor R_s T_m \rfloor \rceil}=2048$, and one pair of Golay complementary sequences $G_{a1}2048/G_{b1}2048$ is generated.

Then the one pair of Golay complementary sequences is repeatedly and alternately placed twice separately, and the cyclic prefix with a length of L is added, to construct a beam training sequence E-T/R. Specifically, the beam training sequence E-T/R may be generated based on FIG. 6-b.

In a twenty-first embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of MIMO antennas is 2.

Based on the solution in this embodiment, $L=2^m=2^{\lceil log2\lfloor R_s T_m \rfloor \rceil}=2048$, and two pairs of Golay complementary sequences $G_{a1}2048/G_{b1}2048$ and $G_{a2}2048/G_{b2}2048$ are generated.

Then the two pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a twenty-second embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of MIMO antennas is 4.

Based on the solution in this embodiment, $L=2^m=2^{\lceil log2\lfloor R_s T_m \rfloor \rceil}=2048$, and four pairs of Golay complementary sequences $G_{a1}2048/G_{b1}2048$, $G_{a2}2048/G_{b2}2048$, $G_{a3}2048/G_{b3}2048$, and $G_{a4}2048/G_{b4}2048$ are generated.

Then the four pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

In a twenty-third embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of MIMO antennas is 8.

Based on the solution in this embodiment, $L=2^m=2^{\lceil log2\lfloor R_s T_m \rfloor \rceil}=2048$, and eight pairs of Golay complementary sequences $G_{a1}2048/G_{b1}2048$, $G_{a2}2048/G_{b2}2048$, $G_{a3}2048/G_{b3}2048$, $G_{a4}2048/G_{b4}2048$, $G_{a5}2048/G_{b5}2048$, $G_{a6}2048/G_{b6}2048$, $G_{a7}2048/G_{b7}2048$, and $G_{a8}2048/G_{b8}2048$ are generated.

Then the eight pairs of Golay complementary sequences are repeatedly and alternately placed twice separately, and the cyclic prefix with a length of L is added, to construct a beam training sequence E-T/R. Specifically, the beam training sequence E-T/R may be generated based on FIG. 6-b.

It can be learned that, in the technical solution provided in this embodiment of the present invention, the Golay complementary sequences may be repeatedly and alternately placed in a specific manner to obtain the $N_T$ orthogonal Golay sequences with a length of 2×N×L, and then the cyclic prefix with a length of L is added ahead of each Golay sequence to obtain the beam training sequences for beam training on the channel having $N_T$ antennas, so that the beam training sequences can be no longer restricted by a quantity of antennas, a delay spread value of a channel, and a scenario such as multi-channel bonding, and is applicable to different channel scenario configurations.

Figure 7:
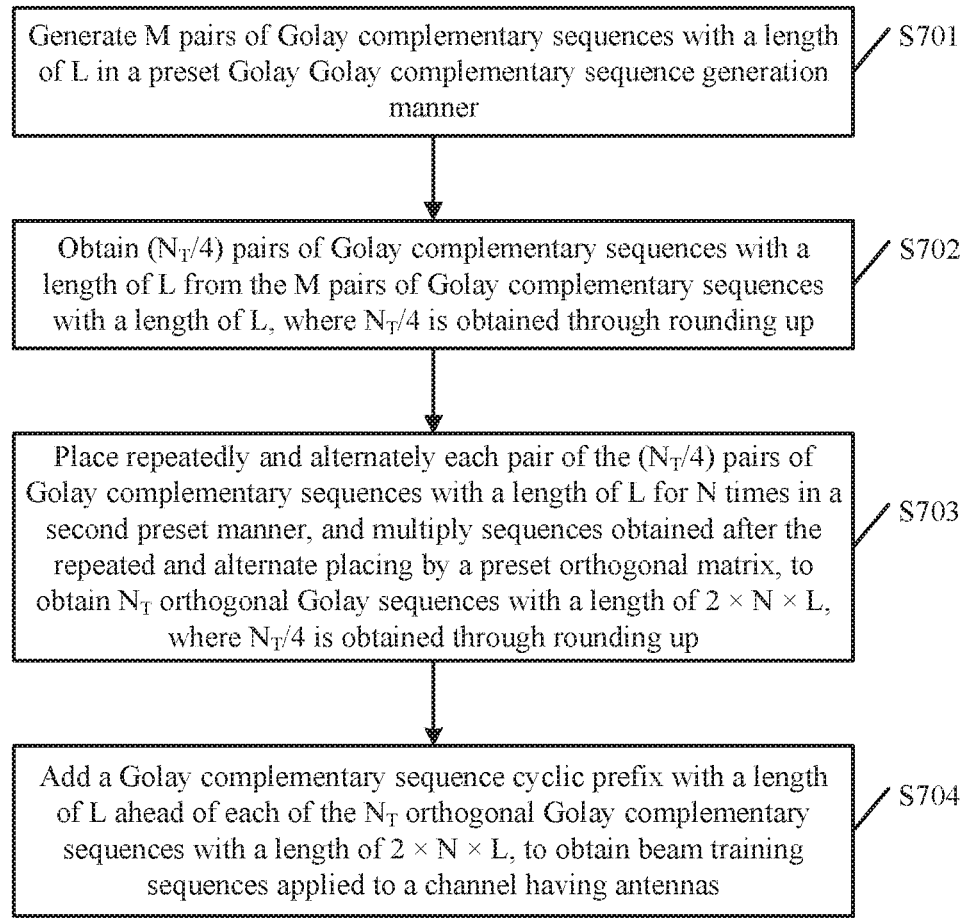
FIG. 7-*a* is a schematic flowchart of a fourth embodiment of a beam training sequence design method according to an embodiment of the present invention.

FIG. 7-a is a schematic flowchart of a fourth embodiment of a beam training sequence design method according to an embodiment of the present invention. In the method shown in FIG. 7-a, for content that is the same as or similar to content in the method shown in FIG. 4, FIG. 5, or FIG. 6-a, refer to detailed descriptions in FIG. 4, FIG. 5, or FIG. 6-a. Details are not described herein again. The method includes the following steps.

S701 Generate M pairs of Golay complementary sequences with a length of L in a preset Golay complementary sequence generation manner.

The M pairs of Golay complementary sequences with a length of L are defined in a finite $Z_H$ field. Each pair of the M pairs of Golay complementary sequences with a length of L includes two Golay complementary sequences with a length of L. L is a signal length corresponding to a maximum delay $T_m$ of a channel. Both M and L are positive integers greater than 0.

S702. Obtain $\lceil N_T/4 \rceil$ pairs of Golay complementary sequences with a length of L from the M pairs of Golay complementary sequences with a length of L.

$N_T$ is a quantity of antennas at a transmit end. $N_T$ is a positive integer greater than 0. N is a positive integer greater than 0. A value of M is greater than or equal to a value of $N_T$.

S703. Place repeatedly and alternately each pair of the $\lceil N_T/4 \rceil$ pairs of Golay complementary sequences with a length of L for N times in a second preset manner, and multiply sequences obtained after the repeated and alternate placing by a preset orthogonal matrix, to obtain $N_T$ orthogonal Golay sequences with a length of 2×N×L, where the preset orthogonal matrix is a 2N-order orthogonal matrix.

Preferably, a value of N is 2, so that the preset orthogonal matrix is a 4-order orthogonal matrix.

S704. Add a Golay complementary sequence cyclic prefix with a length of L ahead of each of the $N_T$ orthogonal Golay complementary sequences with a length of 2×N×L, to obtain beam training sequences applied to a channel having $N_T$ antennas.

Specifically, the following describes examples of methods for generating a beam training sequence by using this method in different channel scenarios.

In a first embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 2.

Based on the solution in this embodiment, $L=2^m=2^{\lceil log2\lfloor R_s T_m \rfloor \rceil}=128$, and one pair of Golay complementary sequences $G_{a1}128/G_{b1}128$ is generated.

Then the one pair of Golay complementary sequences is repeatedly and alternately placed twice, and sequences obtained after the repeated and alternate placing are multiplied by a 4×4 orthogonal matrix P, to obtain four orthogonal sequences:

$$[-Gb_1 128 \quad Ga_1 128 \quad Gb_1 128 \quad Ga_1 128] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 128 & Ga_1 128 & Gb_1 128 & Ga_1 128 \\ -Gb_1 128 & -Ga_1 128 & Gb_1 128 & -Ga_1 128 \\ -Gb_1 128 & Ga_1 128 & -Gb_1 128 & -Ga_1 128 \\ -Gb_1 128 & -Ga_1 128 & -Gb_1 128 & Ga_1 128 \end{bmatrix}.$$

Any two sequences are selected from the orthogonal sequences, and the cyclic prefix with a length of L is added, to construct a beam training sequence E-T/R. Specifically, the beam training sequence E-T/R may be generated based on FIG. 7-$c$. FIG. 7-$c$ is a third schematic diagram of a beam training sequence according to an embodiment of the present invention.

In a second embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 4.

Based on the solution in this embodiment, $L=2^m=2^{log_2\lceil R_sT_m\rceil}=128$, and one pair of Golay complementary sequences $G_{a1}128/G_{b1}128$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 128 \quad Ga_1 128 \quad Gb_1 128 \quad Ga_1 128] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 128 & Ga_1 128 & Gb_1 128 & Ga_1 128 \\ -Gb_1 128 & -Ga_1 128 & Gb_1 128 & -Ga_1 128 \\ -Gb_1 128 & Ga_1 128 & -Gb_1 128 & -Ga_1 128 \\ -Gb_1 128 & -Ga_1 128 & -Gb_1 128 & Ga_1 128 \end{bmatrix}.$$

Four of the orthogonal sequences are selected, and the cyclic prefix with a length of L is added, to construct a beam training sequence E-T/R. Specifically, the beam training sequence E-T/R may be generated based on FIG. 7-$d$. FIG. 7-$d$ is a fourth schematic diagram of a beam training sequence according to an embodiment of the present invention.

In a third embodiment, it is assumed that the maximum delay $T_m$ of the to-be-estimated channel is 72 ns, a symbol rate $R_s$ is 1.76 Gbps (CB=1), and a quantity $N_T$ of MIMO antennas is 8.

Based on the solution in this embedment, $L=2^m=2^{log_2\lceil R_sT_m\rceil}=128$, and two pairs of Golay complementary sequences $G_{a1}128/G_{b1}128$ and $G_{a2}128/G_{b2}128$ are generated.

Then the two pairs of Golay complementary sequences are repeatedly and alternatively placed twice, and sequences obtained after the repeated and alternate placing are multiplied by a 4×4 orthogonal matrix P, to obtain eight orthogonal sequences:

$$[-Gb_1 128 \quad Ga_1 128 \quad Gb_1 128 \quad Ga_1 128] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 128 & Ga_1 128 & Gb_1 128 & Ga_1 128 \\ -Gb_1 128 & -Ga_1 128 & Gb_1 128 & -Ga_1 128 \\ -Gb_1 128 & Ga_1 128 & -Gb_1 128 & -Ga_1 128 \\ -Gb_1 128 & -Ga_1 128 & -Gb_1 128 & Ga_1 128 \end{bmatrix};$$

and $$[-Gb_2 128 \quad Ga_2 128 \quad Gb_2 128 \quad Ga_2 128] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_2 128 & Ga_2 128 & Gb_2 128 & Ga_2 128 \\ -Gb_2 128 & -Ga_2 128 & Gb_2 128 & -Ga_2 128 \\ -Gb_2 128 & Ga_2 128 & -Gb_2 128 & -Ga_2 128 \\ -Gb_2 128 & -Ga_2 128 & -Gb_2 128 & Ga_2 128 \end{bmatrix}.$$

Eight of the orthogonal sequences are selected, and the cyclic prefix with a length of L is added, to construct a beam training sequence E-T/R. Specifically, the beam training sequence E-T/R may be generated based on FIG. 7-$e$. FIG. 7-$e$ is a fifth schematic diagram of a beam training sequence according to an embodiment of the present invention.

In a fourth embodiment, it is assumed that the maximum delay $T_m$ of the to-be-estimated channel is 72 ns, a symbol rate $R_s$ is 3.52 Gbps (CB=2), and a quantity $N_T$ of SISO antennas is 1.

Based on the solution in this embodiment, $L=2^m=2^{log_2\lceil R_sT_m\rceil}=256$, and one pair of Golay complementary sequences $G_{a1}256/G_{b1}256$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 256 \quad Ga_1 256 \quad Gb_1 256 \quad Ga_1 256] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 256 & Ga_1 256 & Gb_1 256 & Ga_1 256 \\ -Gb_1 256 & -Ga_1 256 & Gb_1 256 & -Ga_1 256 \\ -Gb_1 256 & Ga_1 256 & -Gb_1 256 & -Ga_1 256 \\ -Gb_1 256 & -Ga_1 256 & -Gb_1 256 & Ga_1 256 \end{bmatrix}.$$

Any two sequences are selected from the orthogonal sequences, and the cyclic prefix with a length of L is added, to construct a beam training sequence E-T/R. Specifically, the beam training sequence E-T/R may be generated based on FIG. 7-$b$. FIG. 7-$b$ is a second schematic diagram of a beam training sequence according to an embodiment of the present invention.

In a fifth embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 2.

Based on the solution in this embodiment, $L=2^m=2^{log_2\lceil R_sT_m\rceil}=256$, and one pair of Golay complementary sequences $G_{a1}256/G_{b1}256$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 256 \quad Ga_1 256 \quad Gb_1 256 \quad Ga_1 256] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

-continued $$\begin{bmatrix} -Gb_1256 & Ga_1256 & Gb_1256 & Ga_1256 \\ -Gb_1256 & -Ga_1256 & Gb_1256 & -Ga_1256 \\ -Gb_1256 & Ga_1256 & -Gb_1256 & -Ga_1256 \\ -Gb_1256 & -Ga_1256 & -Gb_1256 & Ga_1256 \end{bmatrix}.$$

Any two sequences are selected from the orthogonal sequences, and the cyclic prefix with a length of L is added, to construct a beam training sequence E-T/R. Specifically, the beam training sequence E-T/R may be generated based on FIG. 7-*c*.

In a sixth embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 4.

Based on the solution in this embodiment, $L=2^m=2^{log_2\lceil R_sT_m\rceil}=256$, and one pair of Golay complementary sequences $G_{a1}256/G_{b1}256$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1256 \ Ga_1256 \ Gb_1256 \ Ga_1256]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1256 & Ga_1256 & Gb_1256 & Ga_1256 \\ -Gb_1256 & -Ga_1256 & Gb_1256 & -Ga_1256 \\ -Gb_1256 & Ga_1256 & -Gb_1256 & -Ga_1256 \\ -Gb_1256 & -Ga_1256 & -Gb_1256 & Ga_1256 \end{bmatrix}.$$

Four of the orthogonal sequences are selected, and the cyclic prefix with a length of L is added, to construct a beam training sequence E-T/R. Specifically, the beam training sequence E-T/R may be generated based on FIG. 7-*d*.

In a seventh embodiment, it is assumed that the maximum delay $T_m$ of the to-be-estimated channel is 72 ns, a symbol rate $R_s$ is 3.52 Gbps (CB=2), and a quantity $N_T$ of MIMO antennas is 8.

Based on the solution in this embodiment, $L=2^m=2^{log_2\lceil R_sT_m\rceil}=256$, and two pairs of Golay complementary sequences $G_{a1}256/G_{b1}256$ and $G_{a2}256/G_{b2}256$ may be generated.

Then the two pairs of Golay complementary sequences are repeatedly and alternately placed twice, and sequences obtained after the repeated and alternate placing are multiplied by a 4×4 orthogonal matrix P, to obtain eight orthogonal sequences:

$$[-Gb_2256 \ Ga_2256 \ Gb_2256 \ Ga_2256]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_2256 & Ga_2256 & Gb_2256 & Ga_2256 \\ -Gb_2256 & -Ga_2256 & Gb_2256 & -Ga_2256 \\ -Gb_2256 & Ga_2256 & -Gb_2256 & -Ga_2256 \\ -Gb_2256 & -Ga_2256 & -Gb_2256 & Ga_2256 \end{bmatrix};$$

and $$[-Gb_1256 \ Ga_1256 \ Gb_1256 \ Ga_1256]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1256 & Ga_1256 & Gb_1256 & Ga_1256 \\ -Gb_1256 & -Ga_1256 & Gb_1256 & -Ga_1256 \\ -Gb_1256 & Ga_1256 & -Gb_1256 & -Ga_1256 \\ -Gb_1256 & -Ga_1256 & -Gb_1256 & Ga_1256 \end{bmatrix}.$$

Eight sequences are selected from the orthogonal sequences, and the cyclic prefix with a length of L is added, to construct a beam training sequence E-T/R. Specifically, the beam training sequence E-T/R may be generated based on FIG. 7-*e*.

In an eighth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of SISO antennas is 1.

Based on the solution in this embodiment, $L=2^m=2^{log_2\lceil R_sT_m\rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1512 \ Ga_1512 \ Gb_1512 \ Ga_1512]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1512 & Ga_1512 & Gb_1512 & Ga_1512 \\ -Gb_1512 & -Ga_1512 & Gb_1512 & -Ga_1512 \\ -Gb_1512 & Ga_1512 & -Gb_1512 & -Ga_1512 \\ -Gb_1512 & -Ga_1512 & -Gb_1512 & Ga_1512 \end{bmatrix}.$$

Any one sequence is selected from the orthogonal sequences, and the cyclic prefix with a length of L is added, to construct a beam training sequence E-T/R. Specifically, the beam training sequence E-T/R may be generated based on FIG. 7-*b*.

In a ninth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of MIMO antennas is 2.

Based on the solution in this embodiment, $L=2^m=2^{log_2\lceil R_sT_m\rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix}.$$

Any two sequences are selected from the orthogonal sequences, and the cyclic prefix with a length of L is added, to construct a beam training sequence E-T/R. Specifically, the beam training sequence E-T/R may be generated based on FIG. 7-c.

In a tenth embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of MIMO antennas is 4.

Based on the solution in this embodiment, $L=2^m=2^{\lceil log2 \lfloor R_s T_m \rfloor \rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix}.$$

Any four sequences are selected from the orthogonal sequences, and the cyclic prefix with a length of L is added, to construct a beam training sequence E-T/R. Specifically, the beam training sequence E-T/R may be generated based on FIG. 7-d.

In an eleventh embodiment, it is assumed that the maximum delay $T_m$ of the to-be-estimated channel is 72 ns, a symbol rate $R_s$ is 5.28 Gbps or 7.04 Gbps (CB=3 or CB=4), and a quantity $N_T$ of MIMO antennas is 8.

Based on the solution in this embodiment, $L=2^m=2^{\lceil log2 \lfloor R_s T_m \rfloor \rceil}=512$, and two pairs of Golay complementary sequences $G_{a1}512/G_{b1}512$ and $G_{a2}512/G_{b2}512$ are generated.

Then the two pairs of Golay complementary sequences are repeatedly and alternatively placed twice, and sequences obtained after the repeated and alternate placing are multiplied by a 4×4 orthogonal matrix P, to obtain eight orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix};$$

and $$[-Gb_2 512 \quad Ga_2 512 \quad Gb_2 512 \quad Ga_2 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_2 512 & Ga_2 512 & Gb_2 512 & Ga_2 512 \\ -Gb_2 512 & -Ga_2 512 & Gb_2 512 & -Ga_2 512 \\ -Gb_2 512 & Ga_2 512 & -Gb_2 512 & -Ga_2 512 \\ -Gb_2 512 & -Ga_2 512 & -Gb_2 512 & Ga_2 512 \end{bmatrix}.$$

Eight of the orthogonal sequences are selected, and the cyclic prefix with a length of L is added, to construct a beam training sequence E-T/R. Specifically, the beam training sequence E-T/R may be generated based on FIG. 7-e.

In a twelfth embodiment, it is assumed that the maximum delay $T_m$ of the to-be-estimated channel is 300 ns, a symbol rate $R_s$ is 1.76 Gbps (CB=1), and a quantity $N_T$ of SISO antennas is 1.

Based on the solution in this embodiment, $L=2^m=2^{\lceil log2 \lfloor R_s T_m \rfloor \rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix}.$$

Any one sequence is selected from the orthogonal sequences, and the cyclic prefix with a length of L is added, to construct a beam training sequence E-T/R. Specifically, the beam training sequence E-T/R may be generated based on FIG. 7-b.

In a thirteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 2.

Based on the solution in this embodiment, $L=2^m=2^{\lceil log2 \lfloor R_s T_m \rfloor \rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix}.$$

Any two sequences are selected from the orthogonal sequences, and the cyclic prefix with a length of L is added, to construct a beam training sequence E-T/R. Specifically, the beam training sequence E-T/R may be generated based on FIG. 7-c.

In a fourteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 4.

Based on the solution in this embodiment, $L=2^m=2^{\log_2\lceil R_s T_m\rceil}=512$, and one pair of Golay complementary sequences $G_{a1}512/G_{b1}512$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 512 \quad Ga_1 512 \quad Gb_1 512 \quad Ga_1 512] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix}.$$

Four of the orthogonal sequences are selected, and the cyclic prefix with a length of L is added, to construct a beam training sequence E-T/R. Specifically, the beam training sequence E-T/R may be generated based on FIG. 7-d.

In a fifteenth embodiment, it is assumed that the maximum delay $T_m$ of the to-be-estimated channel is 300 ns, a symbol rate $R_s$ is 1.76 Gbps (CB=1), and a quantity $N_T$ of MIMO antennas is 8.

Based on the solution in this embodiment, $L=2^m=2^{\log_2\lceil R_s T_m\rceil}=512$, and two pairs of Golay complementary sequences $G_{a1}512/G_{b1}512$ and $G_{a2}512/G_{b2}512$ are generated.

Then the two pairs of Golay complementary sequences are repeatedly and alternatively placed twice, and sequences obtained after the repeated and alternate placing are multiplied by a 4×4 orthogonal matrix P, to obtain eight orthogonal sequences:

$$[-Gb_1 512 \quad Ga_1 512 \quad Gb_1 512 \quad Ga_1 512]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_1 512 & Ga_1 512 & Gb_1 512 & Ga_1 512 \\ -Gb_1 512 & -Ga_1 512 & Gb_1 512 & -Ga_1 512 \\ -Gb_1 512 & Ga_1 512 & -Gb_1 512 & -Ga_1 512 \\ -Gb_1 512 & -Ga_1 512 & -Gb_1 512 & Ga_1 512 \end{bmatrix};$$

and $$[-Gb_2 512 \quad Ga_2 512 \quad Gb_2 512 \quad Ga_2 512]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_2 512 & Ga_2 512 & Gb_2 512 & Ga_2 512 \\ -Gb_2 512 & -Ga_2 512 & Gb_2 512 & -Ga_2 512 \\ -Gb_2 512 & Ga_2 512 & -Gb_2 512 & -Ga_2 512 \\ -Gb_2 512 & -Ga_2 512 & -Gb_2 512 & Ga_2 512 \end{bmatrix}.$$

Eight of the orthogonal sequences are selected, and the cyclic prefix with a length of L is added, to construct a beam training sequence E-T/R. Specifically, the beam training sequence E-T/R may be generated based on FIG. 7-e.

In a sixteenth embodiment, it is assumed that the maximum delay $T_m$ of the to-be-estimated channel is 300 ns, a symbol rate $R_s$ is 3.52 Gbps (CB=2), and a quantity $N_T$ of SISO antennas is 1.

Based on the solution in this embodiment, $L=2^m=2^{\log_2\lceil R_s T_m\rceil}=1024$, and one pair of Golay complementary sequences $G_{a1}1024/G_{b1}1024$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 1024 \quad Ga_1 1024 \quad Gb_1 1024 \quad Ga_1 1024]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_1 1024 & Ga_1 1024 & Gb_1 1024 & Ga_1 1024 \\ -Gb_1 1024 & -Ga_1 1024 & Gb_1 1024 & -Ga_1 1024 \\ -Gb_1 1024 & Ga_1 1024 & -Gb_1 1024 & -Ga_1 1024 \\ -Gb_1 1024 & -Ga_1 1024 & -Gb_1 1024 & Ga_1 1024 \end{bmatrix}.$$

Any one sequence is selected from the orthogonal sequences, and the cyclic prefix with a length of L is added, to construct a beam training sequence E-T/R. Specifically, the beam training sequence E-T/R may be generated based on FIG. 7-b.

In a seventeenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 2.

Based on the solution in this embodiment, $L=2^m=2^{\log_2\lceil R_s T_m\rceil}=1024$, and one pair of Golay complementary sequences $G_{a1}1024/G_{b1}1024$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 1024 \quad Ga_1 1024 \quad Gb_1 1024 \quad Ga_1 1024]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_1 1024 & Ga_1 1024 & Gb_1 1024 & Ga_1 1024 \\ -Gb_1 1024 & -Ga_1 1024 & Gb_1 1024 & -Ga_1 1024 \\ -Gb_1 1024 & Ga_1 1024 & -Gb_1 1024 & -Ga_1 1024 \\ -Gb_1 1024 & -Ga_1 1024 & -Gb_1 1024 & Ga_1 1024 \end{bmatrix}.$$

Any two sequences are selected front the orthogonal sequences, and the cyclic prefix with a length of L is added, to construct a beam training sequence E-T/R. Specifically, the beam training sequence E-T/R may be generated based on FIG. 7-c.

In an eighteenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 4.

Based on the solution in this embodiment, $L=2^m=2^{log_2\lfloor R_sT_m\rfloor}=1024$, and one pairs of Golay complementary sequences $G_{a1}1024/G_{b1}1024$ are generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_11024 \quad Ga_11024 \quad Gb_11024 \quad Ga_11024]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_11024 & Ga_11024 & Gb_11024 & Ga_11024 \\ -Gb_11024 & -Ga_11024 & Gb_11024 & -Ga_11024 \\ -Gb_11024 & Ga_11024 & -Gb_11024 & -Ga_11024 \\ -Gb_11024 & -Ga_11024 & -Gb_11024 & Ga_11024 \end{bmatrix}.$$

Four of the orthogonal sequences are selected, and the cyclic prefix with a length of L is added, to construct a beam training sequence E-T/R. Specifically, the beam training sequence E-T/R may be generated based on FIG. 7-d.

In a nineteenth embodiment, it is assumed that the maximum delay $T_m$ of the to-be-estimated channel is 300 ns, a symbol rate $R_s$ is 3.52 Gbps (CB=2), and a quantity $N_T$ of MIMO antennas is 8.

Based on the solution in this embodiment, $L=2^m=2^{log_2\lfloor R_sT_m\rfloor}=1024$, and two pairs of Golay complementary sequences $G_{a1}1024/G_{b1}1024$ and $G_{a2}1024/G_{b2}1024$ are generated.

Then the two pairs of Golay complementary sequences are repeatedly and alternatively placed twice, and sequences obtained after the repeated and alternate placing are multiplied by a 4×4 orthogonal matrix P, to obtain eight orthogonal sequences:

$$[-Gb_11024 \quad Ga_11024 \quad Gb_11024 \quad Ga_11024]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_11024 & Ga_11024 & Gb_11024 & Ga_11024 \\ -Gb_11024 & -Ga_11024 & Gb_11024 & -Ga_11024 \\ -Gb_11024 & Ga_11024 & -Gb_11024 & -Ga_11024 \\ -Gb_11024 & -Ga_11024 & -Gb_11024 & Ga_11024 \end{bmatrix};$$

and $$[-Gb_21024 \quad Ga_21024 \quad Gb_21024 \quad Ga_21024]\begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_21024 & Ga_21024 & Gb_21024 & Ga_21024 \\ -Gb_21024 & -Ga_21024 & Gb_21024 & -Ga_21024 \\ -Gb_21024 & Ga_21024 & -Gb_21024 & -Ga_21024 \\ -Gb_21024 & -Ga_21024 & -Gb_21024 & Ga_21024 \end{bmatrix}.$$

Eight of the orthogonal sequences are selected, and the cyclic prefix with a length of L is added, to construct a beam training sequence E-T/R. Specifically, the beam training sequence E-T/R may be generated based on FIG. 7-e.

In a twentieth embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of SISO antennas is 1.

Based on the solution in this embodiment, $L=2^m=2^{log_2\lfloor R_sT_m\rfloor}=2048$, and one pair of Golay complementary sequences $G_{a1}2048/G_{b1}2048$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_12048 \quad Ga_12048 \quad Gb_12048 \quad Ga_12048]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_12048 & Ga_12048 & Gb_12048 & Ga_12048 \\ -Gb_12048 & -Ga_12048 & Gb_11024 & -Ga_12048 \\ -Gb_12048 & Ga_12048 & -Gb_12048 & -Ga_12048 \\ -Gb_12048 & -Ga_12048 & -Gb_12048 & Ga_12048 \end{bmatrix}.$$

Any one sequence is selected from the orthogonal sequences, and the cyclic prefix with a length of L is added, to construct a beam training sequence E-T/R. Specifically, the beam training sequence E-T/R may be generated based on FIG. 7-b.

In a twenty-first embodiment, it is assumed that the maximum delay $T_m$ of the to-be-estimated channel is 300 ns, a symbol rate $R_s$ 5.28 Gbps or 7.04 Gbps (CB=3 or CB=4), and a quantity $N_T$ of MIMO antennas is 2.

Based on the solution in this embodiment, $L=2^m=2^{log_2\lfloor R_sT_m\rfloor}=2048$, and one pair of Golay complementary sequences $G_{a1}2048/G_{b1}2048$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_12048 \quad Ga_12048 \quad Gb_12048 \quad Ga_12048]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_12048 & Ga_12048 & Gb_12048 & Ga_12048 \\ -Gb_12048 & -Ga_12048 & Gb_11024 & -Ga_12048 \\ -Gb_12048 & Ga_12048 & -Gb_12048 & -Ga_12048 \\ -Gb_12048 & -Ga_12048 & -Gb_12048 & Ga_12048 \end{bmatrix}.$$

Any one sequence is selected from the orthogonal sequences, and the cyclic prefix with a length of L is added, to construct a beam training sequence E-T/R. Specifically, the beam training sequence E-T/R may be generated based on FIG. 7-c.

In a twenty-second embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of MIMO antennas is 4.

Based on the solution in this embodiment, $L=2^m=2^{log_2\lfloor R_sT_m\rfloor}=2048$, and one pair of Golay complementary sequences $G_{a1}2048/G_{b1}2048$ is generated.

Then the one pair of Golay complementary sequences is repeatedly and alternatively placed twice, and sequences obtained after the repeated and alternate placing are multiplied by a 4×4 orthogonal matrix P, to obtain four orthogonal sequences:

$$[-Gb_1 2048 \quad Ga_1 2048 \quad Gb_1 2048 \quad Ga_1 2048]$$

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} -Gb_1 2048 & Ga_1 2048 & Gb_1 2048 & Ga_1 2048 \\ -Gb_1 2048 & -Ga_1 2048 & Gb_1 1024 & -Ga_1 2048 \\ -Gb_1 2048 & Ga_1 2048 & -Gb_1 2048 & -Ga_1 2048 \\ -Gb_1 2048 & -Ga_1 2048 & -Gb_1 2048 & Ga_1 2048 \end{bmatrix}.$$

Four of the orthogonal sequences are selected, and the cyclic prefix with a length of L is added, to construct a beam training sequence E-T/R. Specifically, the beam training sequence E-T/R may be generated based on FIG. 7-*d*.

In a twenty-third embodiment, it is assumed that the maximum delay $T_m$ of the to-be-estimated channel is 300 ns, a symbol rate $R_s$ is 5.28 Gbps or 7.04 Gbps (CB=3 or CB=4), and a quantity $N_T$ of MIMO antennas is 8.

Based on the solution in this embodiment, $L=2^m=2^{log2\lfloor R_s T_m \rfloor}=2048$, and two pairs of Golay complementary sequences $G_{a1}2048/G_{b1}2048$ and $G_{a2}2048/G_{b2}2048$ are generated.

Then the two pairs of Golay complementary sequences are repeatedly and alternatively placed twice, and sequences obtained after the repeated and alternate placing are multiplied by a 4×4 orthogonal matrix P, to obtain eight orthogonal sequences:

$$[-Gb_1 2048 \quad Ga_1 2048 \quad Gb_1 2048 \quad Ga_1 2048] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_1 2048 & Ga_1 2048 & Gb_1 2048 & Ga_1 2048 \\ -Gb_1 2048 & -Ga_1 2048 & Gb_1 1024 & -Ga_1 2048 \\ -Gb_1 2048 & Ga_1 2048 & -Gb_1 2048 & -Ga_1 2048 \\ -Gb_1 2048 & -Ga_1 2048 & -Gb_1 2048 & Ga_1 2048 \end{bmatrix};$$

and $$[-Gb_2 2048 \quad Ga_2 2048 \quad Gb_2 2048 \quad Ga_2 2048] \begin{bmatrix} 1 & 1 & 1 & 1 \\ 1 & -1 & 1 & -1 \\ 1 & 1 & -1 & -1 \\ 1 & -1 & -1 & 1 \end{bmatrix} =$$

$$\begin{bmatrix} -Gb_2 2048 & Ga_2 2048 & Gb_2 2048 & Ga_2 2048 \\ -Gb_2 2048 & -Ga_2 2048 & Gb_2 1024 & -Ga_2 2048 \\ -Gb_2 2048 & Ga_2 2048 & -Gb_2 2048 & -Ga_2 2048 \\ -Gb_2 2048 & -Ga_2 2048 & -Gb_2 2048 & Ga_2 2048 \end{bmatrix}.$$

Eight of the orthogonal sequences are selected, and the cyclic prefix with a length of L is added, to construct a beam training sequence E-T/R. Specifically, the beam training sequence E-T/R may be generated based on FIG. 7-*e*.

It can be learned that, in the technical solution provided in this embodiment of the present invention, the $N_T$ orthogonal Golay complementary sequences with a length of 2×N×L may be obtained through multiplication by the orthogonal matrix, where L is the signal length corresponding to the maximum delay $T_m$ of the channel; and the cyclic prefix with a length of L is added ahead of each Golay sequence to obtain the beam training sequences for beam training on the channel having $N_T$ antennas, so that the beam training sequence can be no longer restricted by a quantity of antennas, a delay spread value of a channel, and a scenario such as multi-channel bonding, and is applicable to different channel scenario configurations.

Figure 8:
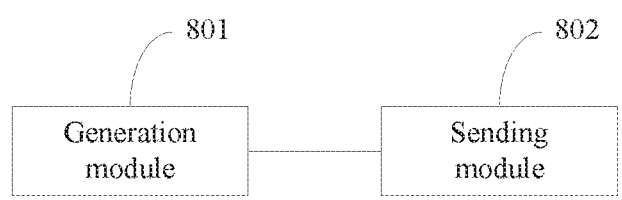
FIG. 8 is a schematic structural diagram of a first embodiment of a beam training sequence design apparatus according to an embodiment of the present invention.

FIG. 8 is a schematic structural diagram of a first embodiment of a beam training sequence design apparatus according to an embodiment of the present invention. The apparatus may be integrated in the foregoing transmit-end device. As shown in FIG. 8, the apparatus may include a generation module 801 and a sending module 802. The sending module 802 may send a signal by using $N_T$ transmit antennas of the apparatus. Details are as follows.

Specifically, the generation module 801 is configured to generate $N_T$ beam training sequences, where each beam training sequence includes a cyclic prefix and a Golay sequence with a length of 2×N×L, the $N_T$ Golay sequences are orthogonal to each other, $N_T$ is a quantity of antennas at a transmit end, L is a signal length corresponding to a maximum delay $T_m$ of a channel, $N_T$ is a positive integer, N is a positive integer, L is a positive integer, and a length of the cyclic prefix is L; and the sending module 802 is configured to send the $N_T$ beam training sequences to a receive end by using the $N_T$ transmit antennas at the transmit end, where each transmit antenna sends one corresponding beam training sequence.

In this embodiment of the present invention, the generation module 801 is specifically configured to:

generate M pairs of Golay complementary sequences with a length of L in a preset Golay complementary sequence generation manner, where the M pairs of Golay complementary sequences with a length of L are defined in a finite $Z_H$ field, each pair of the M pairs of Golay complementary sequences with a length of L includes two Golay complementary sequences with a length of L, L is the signal length corresponding to the maximum delay $T_m$ of the channel, both M and L are positive integers, and the $Z_H$ field is an H-dimensional area.

obtain $N_T$ orthogonal Golay sequences with a length of 2×N×L based on the M pairs of Golay complementary sequences with a length of L, where $N_T$ is the quantity of antennas at the transmit end, $N_T$ is a positive integer, N is a positive integer, and a value of M is greater than or equal to a value of $N_T$; and add the cyclic prefix with a length of L ahead of each of the $N_T$ orthogonal Golay sequences with a length of 2×N×L, to obtain the beam training sequences applied to the channel having $N_T$ antennas.

Optionally, the generation module 801 is specifically configured to:

obtain $N_T$ pairs of Golay complementary sequences with a length of L from the M pairs of Golay complementary sequences with a length of L; and place repeatedly and alternately each pair of the $N_T$ pairs of Golay complementary sequences with a length of L for N times in a first preset manner, to obtain the $N_T$ orthogonal Golay sequences with a length of 2×N×L.

Optionally, the generation module 801 is specifically configured to:

obtain $\lceil N_T/2N \rceil$ pairs of Golay complementary sequences with a length of L from the M pairs of Golay complementary sequences with a length of L; and place repeatedly and alternately each pair of the $\lceil N_T/2N \rceil$ pairs of Golay complementary sequences with a length of L for N times in a second preset manner, and multiply sequences obtained after the repeated and alternate placing by a preset orthogonal matrix, to obtain the $N_T$ orthogonal Golay sequences with a length of 2×N×L, where the preset orthogonal matrix is a 2N-order orthogonal matrix.

Optionally, the signal length L corresponding to the maximum delay $T_m$ of the channel is as follows:

$L=2^{log_2\lceil R_s T_m\rceil}$, where $R_s$ is a symbol rate of the channel.

Optionally, channel configurations of the channel include any one of the following channel configurations:

if the maximum delay $T_m$ of the channel is 72 nanoseconds, a channel bonding CB quantity is 1 so that $R_s$ is 1.76 Gbit/s, and the quantity $N_T$ of antennas at the transmit end is 2, 4, or 8, in the channel configuration, the maximum delay $T_m$ of the channel, the channel bonding CB quantity, and the quantity $N_T$ of antennas at the transmit end are any combination of the following parameter values:

the maximum delay $T_m$ of the channel is 72 nanoseconds or 300 nanoseconds;

the channel bonding CB quantity is 1, 2, 3, or 4, so that $R_s$ is 1.76 Gbit/s, 3.52 Gbit/s, 5.28 Gbit/s, or 7.04 Gbit/s; and the quantity $N_T$ of antennas at the transmit end is 1, 2, 4, or 8.

Optionally, the cyclic prefix is a Golay sequence.

It can be learned that, in the technical solution provided in this embodiment of the present invention, the generation module 801 generates the $N_T$ beam training sequences; then the sending module 802 sends the $N_T$ beam training sequences to the receive end by using the $N_T$ transmit antennas at the transmit end; and after the receive end receives the $N_T$ beam training sequences, each antenna at the receive end performs channel estimation based on the $N_T$ beam training sequences, to obtain $N_T \times 1$ link channel gains. Each beam training sequence includes the cyclic prefix and the Golay sequence with a length of $2 \times N \times L$. The $N_T$ Golay sequences are orthogonal to each other. $N_T$ is the quantity of antennas at the transmit end. L is the signal length corresponding to the maximum delay $T_m$ of the channel. $N_T$ is a positive integer. N is a positive integer. L is a positive integer. Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

The apparatus is configured to perform the foregoing method embodiments. An implementation principle of the apparatus is similar to that of the method embodiments. Details are not described herein again.

Figure 9:
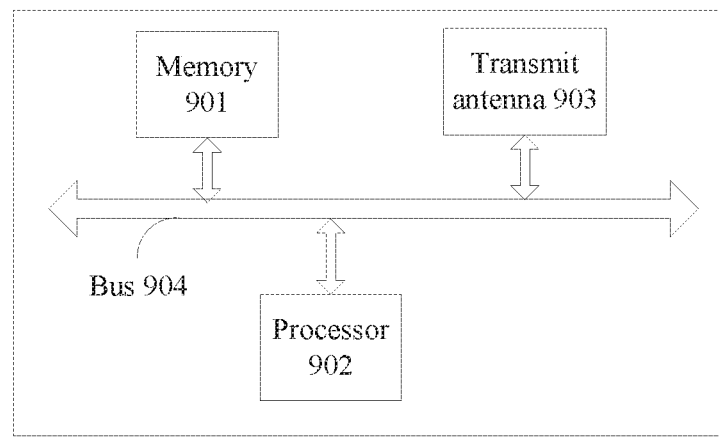
FIG. 9 is a schematic structural diagram of a second embodiment of a beam training sequence design apparatus according to an embodiment of the present invention.

FIG. 9 is a schematic structural diagram of a second embodiment of a beam training sequence design apparatus according to an embodiment of the present invention. The apparatus may be integrated in the foregoing transmit-end device. As shown in FIG. 9, the apparatus may include:

a memory 901, a processor 902, and $N_T$ transmit antennas 903 (a transmit antenna block in FIG. 9 represents the $N_T$ transmit antennas). The memory 901, the processor 902, and the $N_T$ transmit antennas 903 may be coupled together by using a bus 904, but this is not construed as a limitation. In addition to a data bus, the bus 904 may further include a power supply bus, a control bus, a status signal bus, and the like, which are collectively referred to as the bus in this embodiment.

The memory 901 is configured to store a program instruction.

The processor 902 is configured to invoke the program instruction stored in the memory 901 to perform the following method:

generating $N_T$ beam training sequences, where each beam training sequence includes a cyclic prefix and a Golay sequence with a length of $2 \times N \times L$, the $N_T$ Golay sequences are orthogonal to each other, $N_T$ is a quantity of antennas at a transmit end, L is a signal length corresponding to a maximum delay $T_m$ of a channel, $N_T$ is a positive integer, N is a positive integer, L is a positive integer, and a length of the cyclic prefix is L; and sending the $N_T$ beam training sequences to a receive end by using the $N_T$ transmit antennas at the transmit end, where each transmit antenna sends one corresponding beam training sequence.

In this embodiment of the present invention, the processor 902 is specifically configured to:

generate M pairs of Golay complementary sequences with a length of L in a preset Golay complementary sequence generation manner, where the M pairs of Golay complementary sequences with a length of L are defined in a finite $Z_H$ field, each pair of the M pairs of Golay complementary sequences with a length of L includes two Golay complementary sequences with a length of L, L is the signal length corresponding to the maximum delay $T_m$ of the channel, both M and L are positive integers, and the $Z_H$ field is an H-dimensional area;

obtain $N_T$ orthogonal Golay sequences with a length of $2 \times N \times L$ based on the M pairs of Golay complementary sequences with a length of L, where $N_T$ is the quantity of antennas at the transmit end, $N_T$ is a positive integer, N is a positive integer, and a value of M is greater than or equal to a value of $N_T$; and add the cyclic prefix with a length of L ahead of each of the $N_T$ orthogonal Golay sequences with a length of $2 \times N \times L$, to obtain the beam training sequences applied to the channel having $N_T$ antennas.

Optionally, the processor 902 is specifically configured to:

obtain $N_T$ pairs of Golay complementary sequences with a length of L from the M pairs of Golay complementary sequences with a length of L; and place repeatedly and alternately each pair of the $N_T$ pairs of Golay complementary sequences with a length of L for N times in a first preset manner, to obtain the $N_T$ orthogonal Golay sequences with a length of $2 \times N \times L$.

Optionally, the processor 902 is specifically configured to:

obtain $\lceil N_T/2N \rceil$ pairs of Golay complementary sequences with a length of L from the M pairs of Golay complementary sequences with a length of L; and place repeatedly and alternately each pair of the $\lceil N_T/2N \rceil$ pairs of Golay complementary sequences with a length of L for N times in a second preset manner, and multiply sequences obtained after the repeated and alternate placing by a preset orthogonal matrix, to obtain the $N_T$ orthogonal Golay sequences with a length of $2 \times N \times L$, where the preset orthogonal matrix is a 2N-order orthogonal matrix.

Optionally, the signal length L corresponding to the maximum delay $T_m$ of the channel is as follows:

$L=2^{log_2\lceil R_s T_m\rceil}$, where $R_s$ is a symbol rate of the channel.

Optionally, channel configurations of the channel include any one of the following channel configurations:

if the maximum delay $T_m$ of the channel is 72 nanoseconds, a channel bonding CB quantity is 1 so that $R_s$ is 1.76 Gbit/s, and the quantity $N_T$ of antennas at the transmit end is 2, 4, or 8, in the channel configuration, the maximum delay $T_m$ of the channel, the channel bonding CB quantity, and the quantity $N_T$ of antennas at the transmit end are any combination of the following parameter values:

the maximum delay $T_m$ of the channel is 72 nanoseconds or 300 nanoseconds;

the channel bonding CB quantity is 1, 2, 3, or 4, so that $R_s$ is 1.76 Gbit/s, 3.52 Gbit/s, 5.28 Gbit/s, or 7.04 Gbit/s; and the quantity $N_T$ of antennas at the transmit end is 1, 2, 4, or 8.

Optionally, the cyclic prefix is a Golay sequence.

It can be learned that, in the technical solution provided in this embodiment of the present invention, the beam training sequence design apparatus 900 generates the $N_T$ beam training sequences, and then sends the $N_T$ beam training sequences to the receive end by using the $N_T$ transmit antennas at the transmit end; and after the receive end receives the $N_T$ beam training sequences, each antenna at the receive end performs channel estimation based on the $N_T$ beam training sequences, to obtain $N_T \times 1$ link channel gains. Each beam training sequence includes the cyclic prefix and the Golay sequence with a length of 2×N×L. The $N_T$ Golay sequences are orthogonal to each other. $N_T$ is the quantity of antennas at the transmit end. L is the signal length corresponding to the maximum delay $T_m$ of the channel. $N_T$ is a positive integer. N is a positive integer. L is a positive integer. Therefore, a beam training sequence can be no longer restricted by a quantity of antennas, a delay spread value of a channel, and a scenario such as multi-channel bonding provided that the beam training sequence satisfies the foregoing conditions, so that the beam training sequence is applicable to different channel scenario configurations.

The apparatus is configured to perform the foregoing method embodiments. An implementation principle of the apparatus is similar to that of the method embodiments. Details are not described herein again.

An embodiment of the present invention further provides a computer storage medium. The computer storage medium may store a program. When the program is executed, some or all of the steps of any beam training sequence design method described in the foregoing method embodiments are performed.

It should be noted that, to make the description brief, the foregoing method embodiments are expressed as a series of actions. However, persons skilled in the art should know that the present invention is not limited to the described action sequence, because according to the present invention, some steps may be performed in other sequences or performed simultaneously. In addition, persons skilled in the art should also know that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not be performed. In addition, the shown or discussed mutual couplings or direct couplings or communication connections may be implemented through some interfaces. The indirect couplings or communication connections between the apparatuses or units may be implemented in electrical or other forms.

The units described as separate pans may or may not be physically separated, and parts shown as units may or may not be physical units, may be located in one location, or max be distributed on a plurality of network units. Some or all of the units may be selected depending on actual requirements to achieve the objectives of the solutions of the embodiments.

In addition, function units in the embodiments of the present invention may be integrated into one processing unit, or each of the units may exist alone physically, or two or more units may be integrated into one unit. The integrated unit may be implemented in a form of hardware, or may be implemented in a form of a software function unit.

When live integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The storage medium includes any medium that can store program code, such as a USB flash drive, a read-only memory (ROM), a random access memory (RAM), a removable hard disk, a magnetic disk, or an optical disc.

The foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A beam training sequence design apparatus, comprising at least one processor and a transceiver that is coupled to the at least one processor, wherein:

the at least one processor is configured to generate $N_T$ beam training sequences, wherein each beam training sequence comprises a cyclic prefix and a Golay sequence with a length of 2×N×L, wherein the $N_T$ beam training sequences are orthogonal to each other, wherein $N_T$ is a positive integer, wherein N is a positive integer, wherein L is a positive integer, and wherein L is a length of the cyclic prefix;

the transceiver is configured to send the $N_T$ beam training sequences using $N_T$ transmit antennas, wherein each transmit antenna of the $N_T$ transmit antennas sends a single, particular beam training sequence of the $N_T$ beam training sequences; and when $N_T \geq 2$, the beam training sequences comprise a first sequence that is $[G_{a1}128, -G_{b1}128, G_{a1}128, G_{b1}128, G_{a1}128]$ and a second sequence that is $[G_{a2}128, -G_{b2}128, G_{a2}128, G_{b2}128, G_{a2}128]$.

2. The apparatus according to claim 1, wherein each of the beam training sequences is shown as follows:

| $G_{ai}L$ | $-G_{bi}L$ | $G_{ai}L$ | $G_{bi}L$ | $G_{ai}L$. |
| --- | --- | --- | --- | --- |

3. The apparatus according to claim 1, wherein $G_{a2}128=$ [1-1-11-11-11-1-1-1-111-1-11-1-111-11-1-1-1-1-1-1-111-111-11-11-11111-1-1111-1-111-11-1-1-1-1-1-1111-1-11-11-11-1-1-1-111-1-11-1-111-11-1-1-1-1-1-1111-1-11-11-11-1-1-1-111-1-1-111-1-11-11111111-1-1].

4. The apparatus according to claim 1, wherein $G_{b2}128=$ [-111-11-11-11111-1-111-111-1-11-11111111-1-11-1-11-11-11-1-1-1-111-1-1-111-1-1-11111111-1-11-1-11-11-11-1-1-1-111-1-1-111-11-1-1-1-1-1-1111-1-11-11-11-1-1-1-111-1-1-111-1-11-11111111-1-1].

5. A beam training sequence design apparatus, comprising at least one processor and a transceiver that is coupled to the at least one processor, wherein:
  the transceiver is configured to receive $N_T$ beam training sequences, wherein each beam training sequence comprises a cyclic prefix and a Golay sequence with a length of $2\times N\times L$, wherein the $N_T$ beam training sequences are orthogonal to each other, wherein $N_T$ is a positive integer, wherein N is a positive integer, wherein L is a positive integer, and wherein L is a length of the cyclic prefix;
  the at least one processor is configured to perform channel estimation based on the $N_T$ beam training sequences using $N_T$ transmit antennas, wherein each transmit antenna of the $N_T$ transmit antennas sends a single, particular beam training sequence of the $N_T$ beam training sequences; and
  when $N_T \geq 2$, the beam training sequences comprise a first sequence that is $[G_{a1}128, -G_{b1}128, G_{a1}128, G_{b1}128, G_{a1}128]$ and a second sequence that is $[G_{a2}128, -G_{b2}128, G_{a2}128, G_{b2}128, G_{a2}128]$.

6. The apparatus according to claim 5, wherein each of the beam training sequences is shown as follows:

| $G_{ai}L$ | $-G_{bi}L$ | $G_{ai}L$ | $G_{bi}L$ | $G_{ai}L$. |
|---|---|---|---|---|

7. The apparatus according to claim 5, wherein $G_{a2}128=$ [1-1-11-11-1-1-1-111-1-11-1-111-11-1-1-1-1-1-111-111-11-11-11-1-1111-1-1111-1-111-11-1-1-1-1-1-1-1111-1-11-11-11-1-1-1-111-1-11-1-111-11-1-1-1-1-1-1-1111-1-11-11-11-1-1-1-111-1-1-111-1-11-11111111-1-1].

8. The apparatus according to claim 5, wherein $G_{b2}128=$ [-11 1-11-11-11111-1-111-111-1-11-11111111-1-11-1-11-11-11-1-1-1-111-1-1-111-1-11-11111111-1-11-1-11-11-11-1-1-1-111-1-11-1-111-11-1-1-1-1-1-1-1111-1-11-11-11-1-1-1-111-1-1-111-1-11-11111111-1-1].

9. A beam training sequence design method, wherein the method comprises:
  generating $N_T$ beam training sequences, wherein each beam training sequence comprises a cyclic prefix and a Golay sequence with a length of $2\times N\times L$, wherein the $N_T$ beam training sequences are orthogonal to each other, wherein $N_T$ is a positive integer, wherein N is a positive integer, wherein L is a positive integer, and wherein L is a length of the cyclic prefix;
  sending the $N_T$ beam training sequences using $N_T$ transmit antennas, wherein each transmit antenna of the $N_T$ transmit antennas sends a single, particular beam training sequence of the $N_T$ beam training sequences; and
  when $N_T \geq 2$, the beam training sequences comprise a first sequence that is $[G_{a1}128, -G_{b1}128, G_{a1}128, G_{b1}128, G_{a1}128]$ and a second sequence that is $[G_{a2}128, -G_{b2}128, G_{a2}128, G_{b2}128, G_{a2}128]$.

10. The method according to claim 9, wherein each of the beam training sequences is shown as follows:

| $G_{ai}L$ | $-G_{bi}L$ | $G_{ai}L$ | $G_{bi}L$ | $G_{ai}L$. |
|---|---|---|---|---|

11. The method according to claim 9, wherein $G_a2128=$ [1-1-11-11-11-1-1-1-111-1-11-1-111-11-1-1-1-1-1-1-111-111-11-11-11111-1-1111-1-111-11-1-1-1-1-1-1-1111-1-11-11-11-1-1-1-111-1-11-1-111-11-1-1-1-1-1-1-1111-1-11-11-11-1-1-1-111-1-1-111-1-11-11111111-1-1].

12. The method according to claim 9, wherein $G_{b2}128=$ [-11 1-11-11-11111-1-111-111-1-11-11111111-1-11-1-11-11-11-1-1-1-111-1-1-111-1-11-11111111-1-11-1-11-11-11-1-1-1-111-1-11-1-111-11-1-1-1-1-1-1-1111-1-11-11-11-1-1-1-111-1-1-111-1-11-11111111-1-1].

\* \* \* \* \*

UNITED STATES PATENT AND TRADEMARK OFFICE
CERTIFICATE OF CORRECTION

| | | |
|---|---|---|
| PATENT NO. | : 10,879,981 B2 | Page 1 of 1 |
| APPLICATION NO. | : 16/670519 | |
| DATED | : December 29, 2020 | |
| INVENTOR(S) | : Di Yuan, Qingchun Chen and Min Yan | |

It is certified that error appears in the above-identified patent and that said Letters Patent is hereby corrected as shown below:

In the Specification

In Column 1, Line 12, delete "201010512537.5," and insert -- 201610512537.5, --, therefor.

In the Claims

In Column 34, Lines 64-67, in Claim 2, delete

" | $G_{ai}L$ | $-G_{bi}L$ | $G_{ai}L$ | $G_{bi}L$ | $G_{ai}L$ |." and insert -- [$G_{ai}L$, $-G_{bi}L$, $G_{ai}L$, $G_{bi}L$, $G_{ai}L$]. --, therefor.

In Column 35, Line 11, in Claim 5, delete "Abeam" and insert -- A beam --, therefor.

In Column 35, Lines 35-37, in Claim 6, delete

" | $G_{ai}L$ | $-G_{bi}L$ | $G_{ai}L$ | $G_{bi}L$ | $G_{ai}L$ |." and insert -- [$G_{ai}L$, $-G_{bi}L$, $G_{ai}L$, $G_{bi}L$, $G_{ai}L$]. --, therefor.

In Column 35, Line 39, in Claim 7, delete "[1-1-11-11" and insert -- [1-1-11-11-11 --, therefor.

In Column 35, Line 40, in Claim 7, delete "11-1-1111" and insert -- -11111 --, therefor.

In Column 36, Line 4, in Claim 8, delete "[-11 1-" and insert -- [-111- --, therefor.

In Column 36, Lines 27-28, in Claim 10, delete

" | $G_{ai}L$ | $-G_{bi}L$ | $G_{ai}L$ | $G_{bi}L$ | $G_{ai}L$ |." and insert -- [$G_{ai}L$, $-G_{bi}L$, $G_{ai}L$, $G_{bi}L$, $G_{ai}L$]. --, therefor.

In Column 36, Line 36, in Claim 12, delete "[-11 1-" and insert -- [-111- --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*